US006803438B1

(12) United States Patent
Brocchini et al.

(10) Patent No.: US 6,803,438 B1
(45) Date of Patent: Oct. 12, 2004

(54) UNIFORM MOLECULAR WEIGHT POLYMERS

(75) Inventors: Stephen James Brocchini, London (GB); Antony Godwin, Bristol (GB)

(73) Assignee: Polytherics Limited (GB)

( * ) Notice: Subject to any disclaimer, the term of this patent is extended or adjusted under 35 U.S.C. 154(b) by 0 days.

(21) Appl. No.: 10/070,318

(22) PCT Filed: Sep. 8, 2000

(86) PCT No.: PCT/GB00/03456

§ 371 (c)(1),
(2), (4) Date: Aug. 9, 2002

(87) PCT Pub. No.: WO01/18080

PCT Pub. Date: Mar. 15, 2001

(30) Foreign Application Priority Data

Sep. 8, 1999 (EP) ........................................... 99307152

(51) Int. Cl.[7] ................................................ C08F 18/00

(52) U.S. Cl. .................... 526/292.1; 526/204; 526/217; 526/261; 526/262; 526/263; 526/281; 526/307.2

(58) Field of Search ................................ 526/204, 217, 526/261, 262, 263, 281, 292.1, 307.7

(56) References Cited

U.S. PATENT DOCUMENTS 4,228,152 A * 10/1980 Ferruti et al. ................. 424/81

OTHER PUBLICATIONS

Erout et al. Polymer (1996), 37(7), 1157–65.*

Shah et al. Journal of Controlled Release (1997), 45(1), 95–101.*

Yu et al. Eur. Polym J. (1988), 24(11), 1037–40.*

Cole et al. ACS Symposium Series (1987), 350, 245–54.*

Yang et al. Journal of Polymer Science, Part A: Polymer Chemistry (1990), 28(1), 219–26.*

Effective Inhibitors of Hemagglutination by Influenza Virus Synthesized from Polymers Having Active Ester Groups. Insight into Mechanism of Inhibition. J. Med. Chem. 1995, 38 4179–4190. Mathai Mammen, Georg Dahmann, and George M. Whitesides.

Generation and in Situ Evaluation of Lirbaries of Poly-(acrylicacid) Presenting Sialosides as Side Chains as Polyvalent Inhibitors of Influenza–Mediated Hemagglutination. J.Am Chem Soc. 1997, 119, 4103–4111. Seok–Ki Choi, Mathai Mammen and George M. Whitesides.

* cited by examiner

*Primary Examiner*—Helen L. Pezzuto
(74) *Attorney, Agent, or Firm*—Dickstein, Shapiro, Morin & Oshinsky, LLP.

(57) ABSTRACT

A polymer comprising the unit (I) wherein R is selected form the group consisting of hydrogen, $C_1$–$C_{18}$ alkyl, $C_1$–$C_{18}$ aralkyl, $C_1$–$C_{18}$ alkaryl, carboxylic acid, carboxy-$C_{1\text{-}6}$alkyl, or any one of the $C_1$–$C_{18}$ alkyl, $C_1$–$C_{18}$ alkenyl, $C_1$–$C_{18}$ aralkyl, $C_1$–$C_{18}$ alkaryl substituted with a heteroatom within, or attached to, the carbon backbone; $R^1$ is selected from the group consisting of hydrogen, $C_1$–$C_6$ alkyl groups; X is an acylating agent and wherein the polymer has a polydispersity of less than 1.4, preferably less than 1.2 and a molecular weight (Mw) of less than 100,000, the polymer is preferably made by controlled radical polymerization and is useful in the production of polymer drug conjugates with desirable biological profiles.

49 Claims, 12 Drawing Sheets

UNIFORM MOLECULAR WEIGHT POLYMERS

FIELD OF THE INVENTION

The present invention is concerned with a class of polymer precursors with narrow molecular weight distribution and the production therefrom of physiologically soluble polymer therapeutics, functionalised polymers, pharmaceutical compositions and materials, all with similar molecular weight characteristics and a narrow molecular weight distribution.

BACKGROUND OF THE INVENTION

Polymer Therapeutics (Duncan R: Polymer therapeutics for tumour specific delivery *Chem & Ind* 1997, 7, 262–264) are developed for biomedical applications requiring physiologically soluble polymers and include biologically active polymers, polymer-drug conjugates, polymer-protein conjugates, and other covalent constructs of polymer with bioactive molecules. An exemplary class of a polymer-drug conjugate is derived from copolymers of hydroxypropyl methacrylamide (HPMA) which have been extensively studied for the conjugation of cytotoxic drugs for cancer chemotherapy (Duncan R: Drug-polymer conjugates: potential for improved chemotherapy. *Anti-Cancer Drugs,* 1992, 3, 175–210. Putnam D, Kopecek J: Polymer conjugates with anticancer activity. *Adv.Polym.Sci.,* 1995, 122, 55–123. Duncan R, Dimitrijevic S, Evagorou E: The role of polymer conjugates in the diagnosis and treatment of cancer. *STP Pharma,* 1996, 6, 237–263). An HPMA copolymer conjugated to doxorubicin known as PK-1, is currently in Phase II evaluation in the UK. PK-1 displayed reduced toxicity compared to free doxorubicin in the Phase I studies (Vasey P, Twelves C, Kaye S, Wilson P, Morrison R, Duncan R, Thomson A, Hilditch T, Murray T, Burtles S, Cassidy J: Phase I clinical and pharmacokinetic study of PKI (HPMA copolymer doxorubicin): first member of a new class of chemotherapeutic agents: drug-polymer conjugates. *Clin. Cancer Res.,* 1999, 5, 83–94). The maximum tolerated dose of PK-1 was 320 mg/m$^2$ which is 4–5 times higher than the usual clinical dose of free doxorubicin.

The polymers used to develop Polymer Therapeutics may also be separately developed for other biomedical applications where the polymer conjugate is developed (e.g. as a block copolymer) to form aggregates such as polymeric micelles and complexes (Kataoka K, Kwon G, Yokoyama M, Okano T. Sakurai Y: Block copolymer micelles as vehicles for drug delivery. *J. Cont.Rel.,* 1993, 24, 119–132. Inoue T, Chen G, Nakamae K, Hoffman A: An AB block copolymer of oligo(methyl methacrylate) and poly(acrylic acid) for micellar delivery of hydrophobic drugs. *J Cont. Rel.,* 1998, 51, 221–229. Kwon G, Okano T: Polymeric micelles as new drug carriers. *Adv. Drug Del. Rev.,* 1996, 21, 107–116.). The polymers used to develop Polymer Therapeutics may also be separately developed for other biomedical applications that require the polymer be used as a material rather than as a physiologically soluble molecule. Thus, drug release matrices (including microspheres and nanoparticles), hydrogels (including injectable gels and viscious solutions) and hybrid systems (e.g. liposomes with conjugated poly(ethylene glycol) (PEG) on the outer surface) and devices (including rods, pellets, capsules, films, gels) can be fabricated for tissue or site specific drug delivery. Polymers are also clinically widely used as excipients in drug formulation. Within these three broad application areas: (1) physiologically soluble molecules, (2) materials and (3) excipients, biomedical polymers provide a broad technology platform for optimising the efficacy of a therapeutic bioactive agent.

Therapeutic bioactive agents which can be covalently conjugated to a polymer include a drug, peptide and protein. Such conjugation to a soluble, biocompatible polymer can result in improved efficacy of the therapeutic agent. Compared to the free, unconjugated bioactive agent, therapeutic polymeric conjugates can exhibit this improvement in efficacy for the following main reasons: (1) altered biodistribution, (2) prolonged circulation, (3) release of the bioactive in the proteolytic and acidic environment of the secondary lysosome after cellular uptake of the conjugate by pinocytosis and (4) more favourable physicochemical properties imparted to the drug due to the characteristics of large molecules (e.g. increased drug solubility in biological fluids) (Note references in Brocchini S and Duncan R: Polymer drug conjugates: drug release from pendent linkers. The Encyclopedia of Controlled Drug Delivery, Wiley, N.Y., 1999, 786–816.).

Additionally, the covalent conjugation of bioactive agents to a polymer can lead to improved efficacy that is derived from the multiple interactions of one or more of the conjugated bioactive agents with one or more biological targets. Such polyvalent interactions between multiple proteins and ligands are prevalent in biological systems (e.g. adhesion of influenza virus) and can involve interactions that occur at cell surfaces (e.g. receptors and receptor clusters) (Mammen M, Choi S, Whitesides GM: Polyvalent interactions in biological systems: Implications for design and use of multivalent ligands and inhibitors. Angew. *Chem. Int. Ed.* 1998, 37, 2754–2794. Whitesides G, Tananbaum JB. Griffin J, Mammen M: Molecules presenting a multitude of active moieties. PCT Int. Appl. WO 9846270). Multiple simultaneous interactions of a polymer bioactive conjugate will have unique collective properties that differ from properties displayed by the separate, individual, unconjugated bioactive components of the conjugate interacting monovalently.

Additionally, an appropriately functionalised polymer can interact with mucosal membranes (e.g. in the gastrointestinal, respiratory or vaginal tracts) by polyvalent interactions. Such a property is valuable for prolonged and/or preferential localisation of a functionalised polymeric excipient used for site specific delivery or altering optimally the biodistribution of a bioactive agent.

Additionally polymer bioactive agent conjugates and/or aggregates can be designed to be stimuli responsive (Hoffman A, Stayton PS: Interactive molecular conjugates. U.S. Pat. No. 5,998,588), for example, to be for membranelytic after being taken up by a cell by endocytosis. These polymeric constructs must incorporate the membrane penetration features seen in natural macromolecules (toxins and transport proteins) and viruses. Cytosolic access has been shown to be rate limiting during polymer-mediated transfection (Kichler A, Mechtler A, Mechtler K, Behr JP, Wagner E: Influence of membrane-active peptides on lipospermine/DNA complex mediated gene transfer, *Bioconjugate Chem.,* 1997, 8(2), 213–221.). Many of the cationic polymers (e.g. (poly-L-lysine) (PLL) and poly (ethyleneimine) (PEI), chitosan and cationic PAMAM dendrimers) that have been used for in vitro transfection studies are either cytotoxic ($IC_{50}$ values <50 $\mu$g/ml) or hepatotropic after i.v. injection. Such molecules are totally unsuitable for in vivo/clinical development. Alternative endosomolytic molecules have been proposed but are either too toxic (i.e. poly(ethylenimine) or potentially immunogenic (e.g. fusogenic peptides, reviewed (Plank C, Zauner W, Wagner E: Application of membrane-active peptides for drug and gene delivery across cellular membranes, *Advanced Drug Delivery Reviews,* 1998, 34, 21–35. Wagner E, Effects of membrane-active agents in gene delivery, *J. Cont. Release,* 1998, 53, 155–158.). Polymers, some with zwitterionic features, (Richardson S, Kolbe H, Duncan R: Potential of low molecular mass chitosan as a DNA delivery system: Biocompatibility, body distribution and ability to complex and protect DNA *Int. J. Pharm.,* 1999 178, 231–243. Richardson S, Ferruti P, Duncan R: Poly (amidoamine)s as potential endosomolytic polymers: Evaluation of body distribution in normal and tumour baring animals, *J. Drug Targeting,* 1999) have been shown to have considerable potential for membranelytic activity as a function of pH which could be capable of rupturingthe endosome to gain access to the ctyosolic environment of cells.

For the treatment of cancer there are marked improvements in therapeutic efficacy and site specific passive capture through the enhanced permeability and retention (EPR) effect (Matsumura Y, Maeda H: A new concept for macromolecular therapeutics in cancer chemotherapy; mechanism of tumoritropic accumulation of proteins and the antitumour agent SMANCS. *Cancer Res.,* 1986, 6, 6387–6392.). The EPR effect results from enhanced permeability of macromolecules or small particles within the tumour neovasculature due to leakiness of its discontinuous endothelium. In addition to the tumour angiogenesis (hypervasculature) and irregular and incompleteness of vascular networks, the attendant lack of lymphatic drainage promotes accumulation of macromolecules that extravasate. This effect is observed in many solid tumours for macromolecular agents and lipids. The enhanced vascular permeability will support the demand of nutrients and oxygen for the unregulated growth of the tumour. Unless specifically addressed for tumour cell uptake by receptor-medicated endocytosis, polymers entering the intratumoural environment are taken up relatively slowly by fluid-phase pinocytosis. Whereas cellular uptake of low molecular weight molecules usually occurs by rapid transmembrane passage, the uptake of pysiologically soluble polymers occurs almost exclusively by endocytosis (Mellman I: Endocytosis and molecular sorting. *Ann. Rev. Cell Develop. Biol.,* 1996, 12, 575–625. Duncan R, Pratten M: Pinocytosis: Mechanism and Regulation. In: Dean R, Jessup W, eds. Mononuclear Phagocytes: Physiology and Pathology. Amsterdam: Elsevier Biomedical Press, 1985; 27–51.).

Polymer bioactive conjugates can additionally include a conjugated bioactive agent that would induce receptor-mediated endocytosis (Putnam D, Kopecek J: Polymer conjugates with anticancer activity. *Adv.Polym.Sci.,* 1995, 122, 55–123. Duncan R: Drug-polymer conjugates: potential for improved chemotherapy. *Anti-Cancer Drugs,* 1992, 3, 175–210.). For example, HPMA copolymer-doxorubicin containing additionally galactosamine localises selectively in the liver due to uptake by the hepatocyte asialoglycoprotein receptor (Duncan R, Seymour L, Scarlett L, Lloyd J, Rejmanova P, Kopecek J: N-(2-Hydroxypropyl) methacrylamide copolymers with pendant galactosamine residues. Fate after intravenous administration to rats. *Biochim. Biophys. Acta.,* 1986, 880, 62–71. Seymour L, Ulbrich K, Wedge S, Hume I, Strohalm J, Duncan R: N-(2hydroxypropyl)methacrylamide copolymers targeted to the hepatocyte galactose-receptor: pharmacokinetics in DBA-2 mice. *Br. J. Cancer,* 1991, 63, 859–866.).

Enhanced vascular permeability is well known to be present within tissue which has undergone an inflammatory response due to infection or autoimmunedisease. Conjugates of polymers and appropriate bioactive agents could also exploit the vascular premeability gradient between healthy and inflammed tissue in these conditions leading to the passive and preferential accumulation of the conjugate at the inflammed site similar to that observed which has been shown at tumour sites in cancer.

Polymer bioactive conjugates designed to be therapeuctically efficacious by multivalent interactions are being developed as agonists, partial agonists, inverse agonists and antagonists for a multitude of clinical applications including the treatment of diseases such as cancer and infection (Griffin JH, Judice JK: Novel multi-binding therapeutic agents that modulate enzymatic processes, WO 99/64037. Yang G, Meier-Davis S, Griffin JH:Multivalent agonists, partial agonists, inverse agonists and antagonists of the 5-HT3 receptors, WO 99/64046. Christensen BG, Natarajan M, Griffin JH: Multibinding bradykinin antagonists, WO 99/64039. Fatheree P. Pace JL, Judice JK, Griffin JH: Preparation of multibinding Type II topoisomerase inhibitors as antibacterial agents, WO 99/64051. Linsell MS, Meier-Davis S, Griffin JH: Multibinding inhibitors of topoisomerase, WO 99/64054. Griffin JH, Moran EJ, Oare D: Novel therapeutic agents for macromolecular structures. PCT Int. Appl. WO 9964036. Griffin JH, Judice JK: Linked polyene macrolide antibiotic compounds and uses, WO 99/64040. Choi S, Mammen M, Whitesides GM, Griffin JH: Polyvalent presenter combinatorial libraries and their uses, WO 98/47002.).

The four main parts of a polymer-bioactive agent conjugate are (1) polymer, (2) bioactive agent conjugating linker which can be either a pendent chain conjugating linker or a mainchain terminating conjugating linker, (3) solution solubilising pendent chain and (4) the conjugated bioactive agent. While each component has a defined biological function, the sum is greater than the parts because these four components together as a conjugate produce a distinct profile of pharmacological, pharmacokinetic and physicochemical properties typical of physiologically soluble polymer-bioactive agent conjugates. The polymer is not a mere carrier for the bioactive agent. The polymer component of the conjugate can be synthetic or naturally derived. Synthetically derived polymers have the advantage that structure property correlations can be more effectively modulated and correlated in unique ways (Brocchini S, James K, Tangpasuthadol V, Kohn J: Structure-property correlations in a combinatorial library of degradable biomaterials. *J. Biomed. Mater. Res.,* 1998, 42(1), 66–75. Brocchini S, James K, Tangpasuthadol V, Kohn J: A Combinatorial Approach For Polymer Design. *J. Am. Chem. Soc.,* 1997, 119(19), 4553–4554.).

The solution properties of the polymer are directly responsible for defining the circulation half-life, rate of cellular uptake, minimising deleterious side effects of potent cytotoxic drugs and imparting favourable physicochemical properties (e.g. increasing the solubility of lipophilic drugs). The solution properties of a polymer bioactive agent conjugate will be influenced by the structure of the polymer, the conjugating linker and the property modifying pendent chain. Also the amount or loading of the bioactive agent will affect the solution properties of a polymer bioactive conjugate. The solution properties of the conjugate will affect the ultimate biological profile of the conjugate.

Solution properties will contribute to the biocompatibility and rate of clearance of polymer bioactive agent conjugates. Biocompatibility includes the lack of conjugate binding to blood proteins and the lack of a immunogenic response. The conjugate will display a plasma clearance which is primarily governed by the rate of kidney glomerular filtration and the rate of liver uptake. Macromolecules of molecular weight of 40,000–70,000 Da, depending on solution structure, readily pass through the kidney glomerulus and can be excreted. However, as the solution size of a molecule increases with molecular weight (or by forming supramolecular aggregates), extended blood clearance times result. Structural features including polymer flexibility, charge, and hydrophobicity affect the renal excretion threshold for macromolecules within this size range (Duncan R, Cable H, Rypacek F, Drobnik J, Lloyd J: Characterization of the adsorptive pinocytic capture of a polyaspartamide modified by the incorporation of tyramine residues. *Biochim. Biophys. Acta,* 1985, 840, 291–293.). Neutral, hydrophilic polymers including HPMA copolymers, polyvinylpyrrolidone (PVP) and poly(ethylene glycol) (PEG) have flexible, loosely coiled solution structures whereas proteins tend to be charged and exhibit more compact solution structures. For example, the molecular weight threshold limiting glomerular filtration of HPMA copolymer-tyrosinamide in the rat was approximately 45,000 Da (Seymour L, Duncan R, Strohalm J, Kopecek J: Effect of molecular weight (Mw) of N-(2-hydroxypropyl)methacrylamide copolymers on body distributions and rate of excretion after subcutaneous, intraperitoneal and intravenous administration to rats. *J. Biomed. Mater. Res.,* 1987, 21, 1341–1358.) and the threshold for proteins is approximately 60K Da.

Copolymers HPMA have been extensively studied for the conjugation of cytotoxic drugs for cancer chemotherapy (Duncan R, Dimitrijevic S, Evagorou E: The role of polymer conjugates in the diagnosis and treatment of cancer. *STP Pharma,* 1996, 6, 237–263. Putnam D, Kopecek J: Polymer conjugates with anticancer activity. *Adv.Polym.Sci.,* 1995, 122, 55–123. Duncan R: Drugolymer conjugates: potential for improved chemotherapy. *Anti-Cancer Drugs,* 1992, 3, 175–210.). The homopolymer of HPMA is soluble in biological fluids, readily excreted at molecular weights of less than 40,000 Da [4], is non-toxic up to 30 glkg, does not bind blood proteins [5], and is not immunogenic (Rihova B, Ulbrich K, Kopecek J, Mancal P: Immunogenicity of N-(2-hydroxypropyl)methacrylamide copolymers-potential hapten or drug carriers. *Folia Microbioa.,* 1983, 28, 217–297. Rihova B, Kopecek J, Ulbrich K, Chytry V: Immunogenicity of N-(2-hydroxypropyl)methacrylamide copolymers. *Makromol. Chem. Suppl.,* 1985, 9, 13–24. Rihova B, Riha I: Immunological problems of polymer-bound drugs. CRC *Crit. Rev. Therap. Drug Carrier Sys.,* 1985, 1, 311–374. Rihova B, Ulbrich K, Strohalm J, Vetvicka V, Bilej M, Duncan R, Kopecek J: Biocompatibility of N-(2-hydroxypropyl)methacrylamide copolymers containing adriamycin. Immunogenicity, effect of haematopoietic stem cells in bone marrow in viva and effect on mouse splenocytes and human peripheral blood lymphocytes in vitro. *Biomaterials,* 1989, 10, 335–342.) Like poly(ethylene glycol) (PEG) which is generally recognised as safe (GRAS) and is used for the conjugation of proteins, HPMA is biocompatible and is thus a good candidate polymer for conjugation with bioactive agents. Since HPMA copolymers are hydrophilic, solublisation of hydrophobic drugs is possible. Since each HPMA copolymer conjugate is a different copolymer, other hydrophilic polymers similar to HPMA may be good candidate polymers for the conjugation of bioactive agents.

Additionally, the molecular weight characteristics of a polymer-bioactive agent conjugate will influence the ultimate biological profile of the conjugate. Biodistribution and pharmacological activity are known to be molecular weight-dependent. For example, blood circulation half-life (Cartlidge S, Duncan R. Lloyd J, Kopeckova-Rejmanova P, Kopecek J: Soluble crosslinked N-(2-hydroxypropyl) methacrylamide copolymers as potential drug carriers. 2. Effect of molecular weight on blood clearance and body distribution in the rat intravenous administration. Distribution of unfractionated copolymer after intraperitoneal subcutaneous and oral administration. *J Con. Rel.,* 1986, 4, 253–264.), renal clearance, deposition in organs (Sprincl L, Exner J, Sterba 0, Kopecek J: New types of synthetic infusion solutions III. Elimination and retention of poly[N-(2-hydroxypropyl)methacrylamide] in a test organism. *J. Biomed. Mater. Res.,* 1976, 10, 953–963.), rates of endocytic uptake (Duncan R. Pratten M, Cable H, Ringsdorf H, Lloyd J: Effect of molecular size of 1251-labelled poly (vinylpyrrolidone) on its pinocytosis by rat visceral yolk sacs and peritoneal macrophages. *Biochem. J.,* 1981, 196, 49–55. Cartlidge S, Duncan R, Lloyd J, Rejmanova P, Kopecek J: Soluble crosslinked N2-hydroxypropyl) methacrylamide copolymers as potential drug carriers. 1. Pinocytosis by rat visceral yolk sacs and rat intestinal cultured in vitro. Effect of molecular weight on uptake and intracellular degradation. *J. Cont. Rel.,* 1986, 3, 55–66.) and biological activity can depend on polymer molecular weight characteristics (Kaplan A: Antitumor activity of synthetic polyanion. In: Donaruma L, Ottenbrite R. Vogl O, eds. Anionic Polymeric Drugs. New York: Wiley, 1980; 227–254. Ottenbrite R, Regelson W, Kaplan A, Carchman R, Morahan P, Munson A: Biological activity of poly (carboxylic acid) polymers. In: Donaruma L, Vogi O, eds. Polymeric Drugs. New York: Academic Press, 1978; 263–304. Butler G: Synthesis, characterization, and biological activity of pyran copolymers. In: Donaruma L, Ottenbrite R, Vogl O, eds. Anionic Polymeric Drugs. New York: Wiley, 1980; 49–142. Muck K, Rolly H, Burg K: *Makromol. Chem.,* 1977, 178, 2773. Muck K, Christ O, Keller H: *Makromol. Chem.,* 1977, 178, 2785. Seymour L: Synthetic polymers with intrinsic anticancer activity. *J. Bioact. Compat. Polymers,* 1991, 6, 178–216.).

In clinical applications requiring the cellular uptake of a polymeric bioactive agent conjugate with subsequent release of the bioactive agent intracellularly, the linker must be designed to be degraded to release the bioactive agent at an optimal rate within the cell. It is preferable that a the bioactive agent conjugating linker does not degrade in plasma and serum (Vasey P, Duncan R, Twelves C, Kaye S, Strolin-Benedetti M, Cassidy J: Clinical and pharmacokinetic phase 1 study of PK1(HPMA) copolymer doxorubicin. *Annals of Oncology,* 1996, 7, 97.). Upon endocytic uptake into the cell, the conjugate will localise in the lysosomes. These cellular organalles contain a vast array of hydrolytic enzymes including proteases, esterases, glycosidases, phosphates and nucleases. For the treatment of cancer, potent cytotoxic drugs have been conjugated to polymers using conjugation linkers that degrade in the lysosome while remaining intact in the bloodstream. Since many drugs are not pharmacologically active while conjugated to a polymer, this results in drastically reduced toxicity compared to the free drug in circulation.

The conjugating linker structure must be optimised for optimal biological activity. Incorporation of a polymer-drug linker that will only release drug at the target site can reduce peak plasma concentrations thus reducing drug-medicated toxicity. If the drug release rate is optimised, exposure at the target can be tailored to suit the mechanism of action of the bioactive agent being used (e.g. use of cell-cycle dependent antitumour agents) and to prevent the induction of resistance. To be effective, it is important that polymer bioactive agent conjugates are designed to improve localisation of the bioactive agent in the target tissue, diminish deleterious exposure in potential sites of toxicity in other tissue and to optimise the release rate of the bioactive agent in those applications where its release is required for a biological effect. The rate of drug release from the polymer chain can also vary according to the polymer molecular weight and the amount of drug conjugated to the polymer. As greater amounts of hydrophobic drug are conjugated onto a hydrophilic polymer, the possibility to form polymeric micelles increases (Ulbrich K, Konak C, Tuzar Z, Kopecek J: Solution properties of drug carriers based on poly[N-(2hydroxypropyl)methacrylamide] containing biodegradable bonds. *Makromol. Chem.,* 1987, 188, 1261–1272.). Micellar conjugate structures may hinder access of the lysosomal enzymes to degrade the linker and release the conjugated drug. Additionally, hydrophilic polymers conjugated to hydrophobic drugs can exhibit a lower critical solution temperature (LCST) where phase separation occurs and the conjugate becomes insoluble. Simple turbidometric assays (Chytry V, Netopilik M, Bohdanecky M, Ulbrich K: Phase transition parameters of potential thermosensitive drug release systems based on polymers of N-alkylmethacrylamides. *J. Biomater. Sci. Polymer Ed.,* 1997, 8(11), 817–824.) have been used as a preliminary screen to determine the propensity for phase separation at various HPMA copolymer-doxorubicin conjugates of different molecular weight and drug loading (Uchegbu F, Ringsdorf H, Duncan R: The Lower Critical Solution Temperature of Doxorubicin Polymer Conjugates. Proceed. Intern. Symp. Control. Rel. Bioact. Mater., 1996.). As a bioactive agent is released from a polymer due to linker degradation it would be expected that changes in polymer conformation will occur that might also lead to diffences in drug release rate with time (Pitt C, Wertheim J, Wang C, Shah S: Polymer-drug conjugates: Manipulation of drug delivery kinetics. *Macromol. Symp.,* 1997, 123, 225–234. Shah S, Werthim J, Wang C, Pitt C: Polymer-drug conjugates: manipulating drug delivery kinetics using model LCST systems. *J. Cont. Rel.,* 1997, 45, 95–101.)and therefore pharmacological properties. The extent of drug loading and its influence on polymer solution properties is an important, and yet poorly understood phenomenon which must be correlated to structure-property relationships of the polymer-bioactive agent conjugate to lead to optimisation of the the in viva biological properties of therapeutic polymer bioactive agent conjugates. Currently HPMA copolymer-drug conjugates are prepared by a polymer analogous reaction of a low molecular weight drug (e.g. doxorubicin) with a copolymeric precursor which incorporates both the bioactive agent conjugating linker and the solution solubilising pendent chain (Rihova B, Ulbrich K, Strohalm J, Vetvicka V, Bilej M, Duncan R, Kopecek J: Biocompatibility of N-(2-hydroxypropyl)methacrylamide copolymers containing adriamycin. Immunogenicity, effect of haematopoietic stem cells in bone marrow in viva and effect on mouse splenocytes and human peripheral blood lymphocytes in vitro. *Biomaterials,* 1989, 10, 335–342. Kopecek J, Bazilova H: Poly[N-(hydroxypropyl)methecrylamide]-I. Radical polymerisation and copolymerisation. *Eur. Polymer J.,* 1973, 9, 7–14. Strohalm J, Kopecek J: Poly[N-(2-hydroxypropyl) methacrylamide] IV. Heterogeneous polymerisation. *Angew. Makromol. Chem.,* 1978, 70, 109–118. Rejmanova P, Labsky J, Kopecek J: Aminolyses of monomeric and polymeric 4-nitrophenyl esters of N-methacryloylamino acids. *Makromol. Chem.,* 1977, 178, 2159–2168. Kopecek J: Reactive copolymers of N-(2-Hydroxypropyl)methacrylamide with N-methacryloylated derivatives of L-leucine and L-phenylalanine. *Makromol. Chem.,* 1977, 178, 2169–2183. Kopecek J: The potential of water-soluble polymeric carriers in targeted and site-specific drug delivery. *J. Cont. Rel.,* 1990, 11, 279–290.). The vast majority of polymer bioactive agent conjugates prepared by the polymer analogous reaction are prepared by the reaction of the bioactive agent with a copolymeric precursor (Note references in Brocchini S and Duncan R: Polymer drug conjugates: drug release from pendent linkers. The Encyclopedia of Controlled Drug Delivery, Wiley, N.Y., 1999, 786–816.).

The disadvantage of using a copolymer precursor is that for each change in the structure or relative amounts of (1) the bioactive agent conjugating linker or (2) the solution solubilising pendent chain, a new copolymeric precursor must be prepared. Since pendent chain structure is important for the biological profile of a polymer bioactive agent a copolymeric precursor is required to study each conjugate possessing modified conjugating linkers. Solution structure is a function of all the structural features of a bioactive agent polymer conjugate. To elucidate the solution-structure correlations of either the polymer mainchain, conjugating linker or solution solubilising pendent chain requires a different copolymer precursor for each variation of each component.

It is not possible to even use the same copolymeric precursor to vary the amount or loading of the conjugated bioactive agent. If loading of the bioactive agent is to be varied and is to be less than the relative stoichiometry of the conjugating pendent chain, then the remaining conjugating pendent chains will not be conjugated to a drug, and the remaining conjugating pendent chains will be terminate with some other inert molecule. The polymer analogous reaction requires that the copolymeric precursor possess functionality on the conjugation pendent chain termini that is reactive (e.g. a p-nitrophenol active ester of a carboxylic acid) so that upon addition of a bioactive agent, the agent will form a covalent bond with the conjugation pendent chain to become linked to the polymer. Thus if a loading of the bioactive agent is to be less than the relative stoichiometry of the conjugating pendent chain, the reactive functionality must be quenched with a reagent other than the bioactive agent or preferably in this situation, a new polymeric precursor be prepared. These procedures tend to produce polymer conjugates with a wide distribution of structures. It thus becomes impossible to accurately determine structure-property correlations. Clearly, if a loading of the bioactive agent greater than the relative stoichiometry of the conjugation pendent chain is desired, then another copolymeric precursor must be prepared.

Since many polymer bioactive agent conjugates are co-poly-(methacrylamides), the polymer analogous reaction is conducted on a co-poly(methacrylamide) precursor. It is not possible to make the vast majority of such precursors with a narrow molecular weight distribution with a polydisperisty index of less than 2 except in special cases where a copolymer precursor happens to precipitate from the polymerisation solution at a molecular weight below the renal threshold. It is also not possible to make several different copoly(methacrylamides) all possessing the same molecular weight characteristics, e.g. all possessing the same degree of polymerisation and the same molecular weight distribution. The copoly-(methacrylamide) precursors tend to be prepared by free radical polymerisation which typically produce random copolymers typically with a polydisperisity (PD)>1.5–2.0.

Furthermore since the relative stoichiometry of the conjugated bioactive agent, and thus the conjugating linker, is less than the solution solubilising pendent chain, the polymer analogous reaction is frequently on a copolymer precuresor with a low relative stoichiometry of reactive sites for the conjugation of the bioactive agent. This inefficient conjugation strategy is often burdened with competitive hydrolysis reactions and other consuming side reaction that result in conjugating linkers not covalently linked to the bioactive agent (Mendichi R, Rizzo V, Gigli M, Schieroni A G: Molecular characterisation of polymeric antitumour drug carriers by size exclusion chromatograpgy and universal calibration. *J. Liq. Chrom. and Rel. Technol.,* 1996, 19(10), 1591–1605. Configliacchi E, Razzano G, Rizzo V, Vigevani A: HPLC methods for the determination of bound and free doxorubicin and of bound and free galactosamine in methacrylamide polymer-drug conjugates. *J. Pharm. Biomed. Analysis,* 1996, 15, 123–129.). This not only causes significant structure heterogenaity between batches, but also causes significant waste of the bioactive agent because it has not been conjuated and its recovery is too expensive. In the case of conjugate developed for endocytic uptake into a cell, the lysosomal degradation of bioactive agent conjugating pendent chains with pendent chains not linked to the bioactive pendent chain. This competition complicates the pharmacology and pharmacokinetics of the polymer bioactive agent conjugate.

Polymer-bioactive agent conjugates and biomedical polymers currently used for medical applications are, from the perspective of regulatory agencies (e.g. Medicines Control Agency, FDA) not structurally defined. Many conjugates display broad molecular weight distribution and random incorporation of the conjugated bioactive agent. Frequently, the structure of the conjugating linker is varied due to racimisation or incomplete conjugation of the bioactive agent to each of the conjugating linkers.

Future development of physiologically soluble polymers used in the development of polymer-bioactive agent conjugates (i.e. polymer therapeutics) requires that more defined conjugate structures be prepared for study. In this way it will become possible to more accurately elucidate structure-property correlations that influence the biological profile of these macromolecular therapeutics. This is not possible by conducting the polymer analogous reaction on many different copolymeric precursors. There is a need to prepare polymer-bioactive conjugates which have a more narrow molecular weight distribution than are currently available. There is also a need to ensure that each bioactive conjugating linker is structurally the same and is covalently bound to the polymer and the bioactive agent. Additionally there is a need for a more efficient strategy in preclinical development where conjugates with similar molecular weight characteristics are prepared for study and where solution properties can also be varied without changing the molecular weight characteristics of the polymer mainchain. Since HPMA copolymer conjugates are poly(methacrylamides) then any techniques developed that will meet the requirements to prepare such conjugates can also be used to prepare other poly(methacrylates) for other healthcare and consumer applications where the resultant polymer can be used either as a soluble molecule, processible material that can be fabricated into a device or as an excipient. Since only a small limited number of acrylamide homo- and co-polymers with narrow molecular weight distribution can be prepared, then for speciality applications there is need for processes that provide a means to prepare such polymers.

These limitations for conducting the polymer analogous reaction on a copolymer precursor can be alleviated by conducting the polymer analogous reaction with a homopolymeric precursor that has a narrow molecular weight distribution and where each repeat unit is reactive site. Conjugation of a bioactive agent or a derivative is carried out in a first reaction to covalently link the bioactive agent to the polymer. The conjugation is efficient because each repeat unit on the homopolymer precursor is a reactive site available for reaction. Upon conjugation of the bioactive agent, the intermediate precursor is a copolymer comprised of most repeat units being terminated still with a reactive chemical functional group. These are are then allowed to react with a reagent which will become the solution solubilising pendent chain in the final conjugate. By using one such narrow molecular weight distribution homopolymeric precursor it becomes possible to prepare many copolymer conjugates all possess the same narrow molecular weight distribution. Each conjugate will also possess the same molecular weight characteristics of the degree of polymerisation and polydispersity index that the homopolymeric percursor possesses.

This invention is concerned with the synthesis by controlled radical polymerisation processes (Sawamoto M, Masami K: Living radical polymerizations based on transition metal complexes. *Trends Polym. Sci.* 1996, 4, 371–377. Matyjaszewski K:, Mechanistic and synthetic aspects of atom transfer radical polymerization. *Pure Appl. Chem.* 1997, A34, 1785–1801. Chiefari J, Chong Y, Ercole F, Krstina J, Jeffery J, Le T, Mayadunne R, meijs G, Moad C, Moad G, Rizzardo E, Thang S: Living free-radical, polymerization by reversible addition-fragmentation chain transfer: the RAFT process. *Macromolecules,* 1998, 31, 5559–5562. Benoit D, Chaplinski V, Braslau R. Hawker C: Development of a universal alkoxyamine for "living" free radical polymerizations. *J. Am. Chem. Soc.,* 1999, 121, 3904–3920.) of narrow molecular weight distribution homopolymer precursors with a polydispersity index of less than 1.2. These controlled radical polymerisation processes have so far not been shown to give directly acrylamide homo- and co-polymers with narrow molecular weight distribution. This invention is also concerned with the use of these homopolymeric precursors to prepare physiologically soluble polymer bioactive agent conjugates, polymer therapeutics, functionalised polymers, pharmaceutical compositions and materials.

SUMMARY OF THE INVENTION

One embodiment of the present invention provides a polymer comprising the unit (I)

(I)

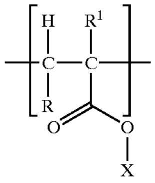

wherein R is selected from the group consisting of hydrogen, $C_1$–$C_{18}$ alkyl, $C_1$–$C_{18}$ alkenyl, $C_1$–$C_{18}$ aralkyl, $C_1$–$C_{18}$ alkaryl, carboxylic acid, carboxy-$C_{1-6}$ alkyl, or any one of $C_1$–$C_{18}$ alkyl, $C_1$–$C_{18}$ alkenyl, $C_1$–$C_{18}$ aralkyl, $C_1$–$C_{18}$ alkaryl substituted with a heteroatom within, or attached to, the carbon backbone; $R^1$ is selected from the group consisting of hydrogen, $C_1$–$C_6$ alkyl groups; X is an acylating group and wherein the polymer has a polydispersity of less than 1.4, preferably less than 1.2 and a molecular weight (Mw) of less than 100,000.

The acylating group X is preferably a carboxylate activating group and is generally selected from the group consisting of N-succinimidyl, pentachlorophenyl, pentafluorophenyl, para-nitrophenyl, dinitrophenyl, N-phthalimido, N-norbornyl, cyanomethyl, pyridyl, trichlorotriazine, 5-chloroquinilino, and imidazole. Preferably X is an N-succinimidyl or imidazole moiety.

Preferably R is selected from the group consisting of hydrogen, $C_1$–$C_6$ alkyl, $C_1$–$C_6$ alkenyl, $C_1$–$C_6$ aralkyl and $C_1$–$C_6$ alkaryl, $C_1$–$C_6$ alkylamido and $C_1$–$C_6$ alkylamido. Most preferably R is selected from hydrogen or methyl.

Preferably $R_1$ is selected from the group consisting of hydrogen, methyl, ethyl, propyl, butyl, pentyl or isomers thereof. Most preferably $R^1$ is selected from hydrogen or methyl.

The polymer of the present invention may be a homopolymer incorporating unit (I), or may be a copolymer or block copolymer incorporating other polymeric, oligomeric or monomeric units. For example, further polymeric units incorporated in the polymer may comprise acrylic polymers, alkylene polymers, urethane polymers, amide polymers, polypeptides, polysaccharides and ester polymers. Preferably, where the polymer is a heteropolymer, additional polymeric components comprise polyethylene glycol, polyaconitic acid or polyesters.

The molecular weight of the polymer should ideally be less than 100,000, preferably 50,000 where the polymer is to be used as a physiologically soluble polymer (in order that the renal threshold is not exceeded). Preferably the molecular weight of the polymer is in the range of 50,000–4000, more preferably 25,000–40,000. Another embodiment of the present invention is a polymer comprising the unit (II)

(II)

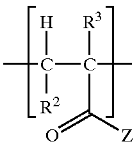

wherein $R^2$ is selected from hydrogen, $C_1$–$C_{18}$ alkyl, $C_1$–$C_{18}$ alkenyl, $C_1$–$C_{18}$ aralkyl, $C_1$–$C_{18}$ alkaryl, carboxylic acid and carboxy-$C_{1-6}$alkyl; $R^3$ is selected from the group consisting of hydrogen, methyl, ethyl, propyl, butyl, pentyl and isomers thereof, Z is a pendent group selected from the group consisting of $NR^4R^5$, $SR^6$ and $OR^7$, wherein $R^4$ is an acyl group, preferably an aminoacyl group or oligopeptidyl group; $R^5$ is selected from hydrogen, $C_1$–$C_{18}$ alkyl, $C_1$–$C_{18}$ alkenyl, $C_1$–$C_{18}$ aralkyl, $C_1$–$C_{18}$ alkaryl; $R^6$ and $R^7$ are selected from the group consisting of hydrogen, $C_1C_{12}$ alkyl, $C_1$–$C_{12}$ alkenyl, $C_1$–$C_{12}$ aralkyl, $C_1$–$C_{12}$ alkaryl, $C_1$–$C_{12}$ alkoxy and $C_1$–$C_{12}$ hydroxyalkyl, and may contain one or more cleavable bonds and may be covalently linked to a bioactive agent. Generally the polymer has a polydispersity of less than 1.4, preferably less than 1.2 and a molecular weight (Mw) of less than 100,000, preferably 50,000.

Preferably $R^2$ is selected from the group consisting of hydrogen, $C_1$–$C_6$ alkyl, $C_1$–$C_6$ alkenyl, $C_1$–$C_6$ aralkyl and $C_1$–$C_6$ alkaryl, $C_1$–$C_6$ alkylamido and $C_1$–$C_6$ alkylamido.

Preferably $R^3$ is selected from the group consisting of hydrogen, methyl, ethyl, propyl, butyl, pentyl or isomers thereof. Most preferably $R^2$ is hydrogen and $R^3$ is hydrogen or methyl.

Z may comprise a peptidic group. Preferably Z comprises one or more aminoacyl groups, preferably 2–6 aminoacyl groups, most preferably 4 aminoacyl groups. In a particularly preferred embodiment group Z comprises a glycine-leucine-phenylalanine-glycine linkage. The aminoacyl linkage is most preferably a peptide linkage capable of being cleaved by preselected cellular enzymes, for instance, those found in liposome of cancerous cells. In another preferred embodiment group Z comprises a cis-aconityl group. This group is designed to remain stable in plasma at neutral pH (~7.4), but degrade intracellularly by hydrolysis in the more acidic environment of the endosome or liposome (~pH 5.5–6.5).

The pendent chain Z may additionally be covalently bound to a ligand or bioactive agent. The ligand may be any ligand which is capable of polyvalent interactions. Preferred bioactive agents are anti-cancer agents such as doxorubicin, daunomycin and paclaxitol.

A further preferred polymer of the present invention has the structure (III)

(III)

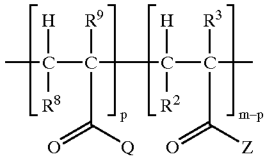

wherein $R^8$ and $R^9$ are selected from the same groups as $R^2$ and $R^3$ respectively, Q is a solubilising groups selected from the group consisting of $C_1C_{12}$ alkyl, $C_1$–$C_{12}$ alkenyl, $C_1$–$C_{12}$ aralkyl, $C_1$ –$C_{12}$ alkaryl, $C_1$–$C_{12}$ alkoxy, $C_1$–$C_{12}$ hydroxyalkyl, $C_1$–$C_{12}$ alkylamido, $C_1$–$C_{12}$ alkylamido, $C_1$–$C_{12}$ alkanoyl, and wherein p is an integer of less than 500.

Preferably Q comprises an amine group, preferably a $C_1$–$C_{12}$ hydroxyalkylamino group, most preferably a 2-hydroxypropylamino moiety. This group is designed to be a solubilising group for the polymer in aqueous solutions. Generally the polymer of the present invention is a water soluble polyacrylamide homo- or copolymer, preferably a polymethacrylamide or polyethacrylamide homo- or copolymer.

In a further embodiment, the present invention provides a process for the production of a polymer, comprising the polymerisation of a compound (IV)

(IV)

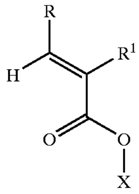

wherein R is selected from the group consisting of hydrogen, $C_1$–$C_{18}$ alkyl, $C_1$–$C_{18}$ alkenyl, $C_1$–$C_{18}$ aralkyl, $C_1$–$C_{18}$ alkaryl, carboxylic acid, carboxy-$C_{1-6}$alkyl, or any one of $C_1$–$C_{18}$ alkyl, $C_1$–$C_{18}$ alkenyl, $C_1$–$C_{18}$ aralkyl, $C_1$–$C_{18}$ alkaryl substituted with a heteroatom within, or attached to, the carbon backbone; $R^1$ is selected from the group consisting of hydrogen and $C_1$–$C_6$ alkyl groups preferably selected from the group consisting of methyl, ethyl, propyl, butyl, pentyl and isomers thereof; X is an acylating group, preferably a carboxylate activating group; wherein the process is a controlled radical polymerization, to produce a narrow weight distribution polymer comprising the unit (I)

(I)

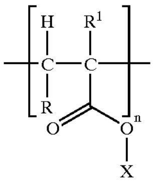

wherein n is an integer of 1 to 500.

Preferably R is selected from the group consisting of hydrogen, $C_1$–$C_6$ alkyl, $C_1$–$C_6$ alkenyl, $C_1$–$C_6$ aralkyl and $C_1$–$C_6$ alkaryl, $C_1$–$C_6$ alkanoyl, $C_1$–$C_6$ alkylamido and $C_1$–$C_6$ alkylamido.

Preferably $R^1$ is selected from the group consisting of hydrogen, methyl, ethyl, propyl, butyl, pentyl or isomers thereof.

Where the polymerization is carried out by atom transfer radical polymerization, a suitable radical initiator is utilised. Such initiators commonly comprise alkylhalides, preferably alkylbromides. In particular, the initiator is 2-bromo-2-methyl-(2-hydroxyethyl)propanoate. The polymerisation is also carried out in the presence of a polymerisation mediator comprising a Cu(I) complex. Such complexes are usually Cu(I)Br complexes, complexed by a chelating ligand. Typical mediators are Cu(I)Br $(Bipy)_2$, Cu(I)Br(Bipy), Cu(I)Br (Pentamethyl diethylene), Cu(I)Br[methyl$_6$ tris(2-aminoethyl)amine] and Cu(I)Br(N,N,N',N",N"-pentamethyidiethylenetriamine).

The reaction should take place in the presence of a suitable solvent. Such solvents are generally aprotic solvents, for example tetrahydrofuran, acetonitrile, dimethylformamide, acetone, dimethylsulphoxide, ethyl acetate, methylformamide and sulpholane and mixtures thereof. Alternatively, water may be used. Particularly preferred solvents are dimethylsulphoxide and dimethylformamide and mixtures thereof.

Alternatively the polymerization may take place via Nitroxide Mediated Polymerization. Again, a suitable Nitroxide Mediated Polymerization initiator is required. Such an initiator generally has the structure

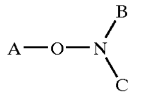

wherein A is selected from the group consisting of $C_1$-$C_{12}$ alkyl, $C_1$–$C_{12}$ alkenyl, $C_1$–$C_{12}$ aralkyl, $C_1$–$C_{12}$ alkaryl, $C_1$–$C_{12}$ hydroxyalkyl, B and C are individually selected from the group consisting of $C_1C_{12}$ alkyl, $C_1$–$C_{12}$ alkenyl, $C_1$–$C_{12}$ aralkyl, $C_1$–$C_{12}$ alkaryl, $C_1$–$C_{12}$ hydroxyalkyl, and may together with N form a $C_1$–$C_{12}$ heterocyclic group and which may contain a heteroatom selected from nitrogen, sulfur, oxygen and phosphorus.

Preferably A is selected from the group consisting of methyl, ethyl, propyl, butyl, pentyl, hexyl, benzyl, methylbenzene, ethyl benzene, propylbenzene or isomers thereof. B and C should generally be sterically crowding the groups capable of stabilising a nitroxide radical. Such groups are generally selected from the group consisting of isopropyl, isobutyl, secbutyl, tert-butyl, isopentyl, sec-pentyl, tert-pentyl, adamantyl, methylbenzene, ethyl benzene, propylbenzene or isomers thereof.

Common initiators have these structures outlined below

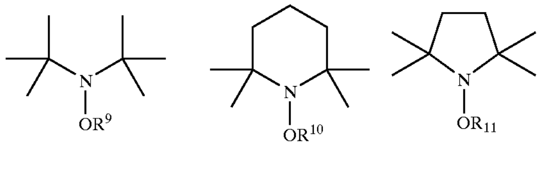

-continued

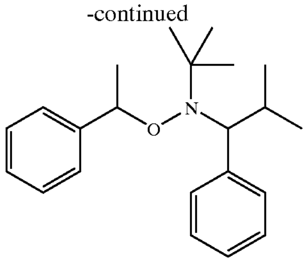

wherein $R^9$ to $R^{11}$ are selected from the group consisting of $C^1$–$C^{12}$ alkyl, $C_1$–$C_{12}$ alkenyl, $C_1$–$C_{12}$ aralkyl, $C_1$–$C_{12}$ alkaryl, $C_1$–$C_{12}$ alkoxy, $C_1$–$C_{12}$ hydroxyalkyl, $C_1$–$C_{12}$ alkylamido, $C_1$–$C_{12}$ alkylamido, $C_1$–$C_{12}$ alkanoyl.

Again, suitable solvents for use with Nitroxide Mediated Polymerisations are aprotic solvents as described above. Alternatively, water may be used. A further embodiment of the present invention provides a process for the production of a polymer, comprising the reaction of a polymer having the formula (VI)

(VI)

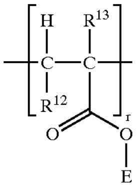

wherein $R^{12}$ is a group selected from the group consisting of hydrogen, $C_1$–$C_{18}$ alkyl, $C_1$–$C_{18}$ alkenyl, $C_1$–$C_{18}$ aralkyl and $C_1$–$C_{18}$ alkaryl groups; $R^{13}$ is selected from the group consisting of $C_1$–$C_6$ alkyl groups; E is a carboxylate activating group and r is an integer of 5 to 500; with a reagent $HR^x$, wherein $R^x$ is selected from the group consisting of $NR^{14}R^{15}$, $SR^{16}$ and $OR^{17}$, wherein $R^{14}$ is an acyl group, preferably an aminoacyl group or oligopeptidyl group; $R^{15}$ is selected from hydrogen, $C_1$–$C_{18}$ alkyl, $C_1$–$C_{18}$ alkenyl, $C_1$–$C_{18}$ aralkyl, $C_1$–$C_{18}$ alkaryl; $R^{16}$ and $R^{17}$ are selected from the group consisting of hydrogen, $C_1C_{12}$ alkyl, $C_1$–$C_{12}$ alkenyl, $C_1$–$C_{12}$ aralkyl, $C_1$–$C_{12}$ alkaryl, $C_1$–$C_{12}$ alkoxy and $C_1$–$C_{12}$ hydroxyalkyl, and may contain one or more cleavable bonds, to form a derivatised polymer having the structure (VII)

(VII)

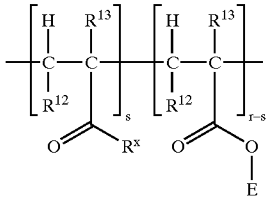

wherein $1 \leqq s \leqq r$.

$R^{12}$ is preferably selected from the group consisting of hydrogen, methyl, ethyl and propyl, $R^{13}$ is selected from the group consisting of hydrogen, methyl, ethyl and propyl and preferably $R^{12}$ is hydrogen and $R^{13}$ are methyl. E is selected from the group consisting of N-succinimidyl, pentachlorophenyl, pentafluorophenyl, para-nitrophenyl, dinitrophenyl, N-phthalimido, N-norbornyl, cyanomethyl, pyridyl, trichlorotriazine, 5-chloroquinilino, and imidazole, preferably N-succinimidyl or imidazole, most preferably N-succinimidyl.

Preferably $HR^x$ is $H_2NR^{14}$.

$HR^x$ is generally a nucleophilic reagent capable of displacing E—O, to form a covalent bond with the acyl group attached to $CR^3$. Preferably $HR^x$ comprises a primary or secondary amine group. Most preferably $HR^x$ comprises a cleavable bond such as a aminoacyl linkage or a cis-aconityl linkage as described hereinbefore. Generally $HR^x$ is covalently attached to a bioactive agent prior to reaction with (VI) subsequent to the production of a polymer having the structure (VII), an additional step of quenching the polymer may take place. This involves reacting the previously unreacted groups E with a quenching group. This group has the formula $HR^{x'}$, preferably comprises an amine moiety and is generally selected to be a solubilising or solubility modifying group for the polymer. Such a quenching compound is, for example a hydrophilic reagent, for example, hydroxypropylamine.

DETAILED DESCRIPTION OF THE INVENTION

The present invention provides a polymer having a polydispersity of less than 1.2. The polymer is preferably an activated polyacrylate ester that is prepared by Controlled Radical Polymerization. These polymers are designed to be derivitisable and may be used to form polymer-drug conjugates having improved biological profile. A particularly preferred polymer of the present invention comprises the structure (X)

(X)

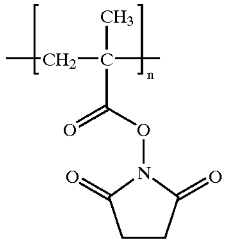

The activating moiety is an N-succinimidyl group. This particular group has been found to be particularly stable in solution and resists spontaneous hydrolysis. This polymer may be produced by Atom Transfer Polymerization using a Cu(I)Br(pentamethyidiethylene) mediator. The polymerization involved the reaction of a monomer (IX) with a suitable aprotic solvent.

(IX)

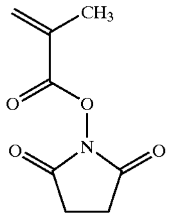

In one preferred embodiment the solvent is tetrahydrofuran. In another preferred embodiment the solvent is dimethylsulphoxide and optionally dimethylformamide in admixture thereof. The reaction is preferably carried out under a nitrogen atmosphere and at a temperature of 0–150° C. A preferred temperature range is 30–80° C., most preferably 50–70° C. The polymer comprising the unit (X) may subsequently be derivatised. The carboxyl activating group may be substituted by a suitable nucleophilic reagent. In order to form polymer drug conjugates it is preferable to derivatise unit (X) with a pendant moiety. Such a moiety could comprise a aminoacyl linkage or a hydrolytically labile linkage as defined hereinbefore. Such a linkage can degrade when entering the lysosome of a diseased cell, thus releasing a drug or drug precursor directly to the target site. Preferably a pendent moiety comprises a Gly-Leu-Phe-Gly linkage or a cis aconityl linkage. Such a pendent linkage may be covalently attached to a drug prior to polymer derivitisation or may be capable of being derivatised subsequent of attachment of the pendent moiety to the polymer backbone, In a preferred embodiment the polymer comprising the unit (X) is reacted with less than 1 equivalent of a pendent group, thus only substituting a pre-specified number of N-succinimidyl moieties. This allows a second, quenching step, which substitutes the remaining N-succinimidyl groups with a solubilising group. Such a group aids in the solubilisation of the polymer in aqueous solutions such as biological fluids. A preferred quenching agent should comprise an amine, for example 2-hydroxypropylamine. An overview of a preferred reaction process is provided in scheme 1 below. In this particular example, the drug doxorubicin is attached to the polymer via a GLFG linkage.

Scheme 1

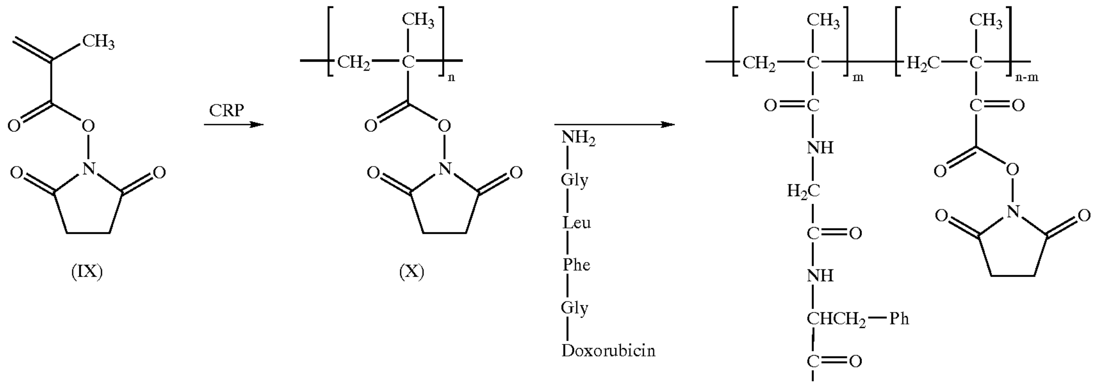

-continued

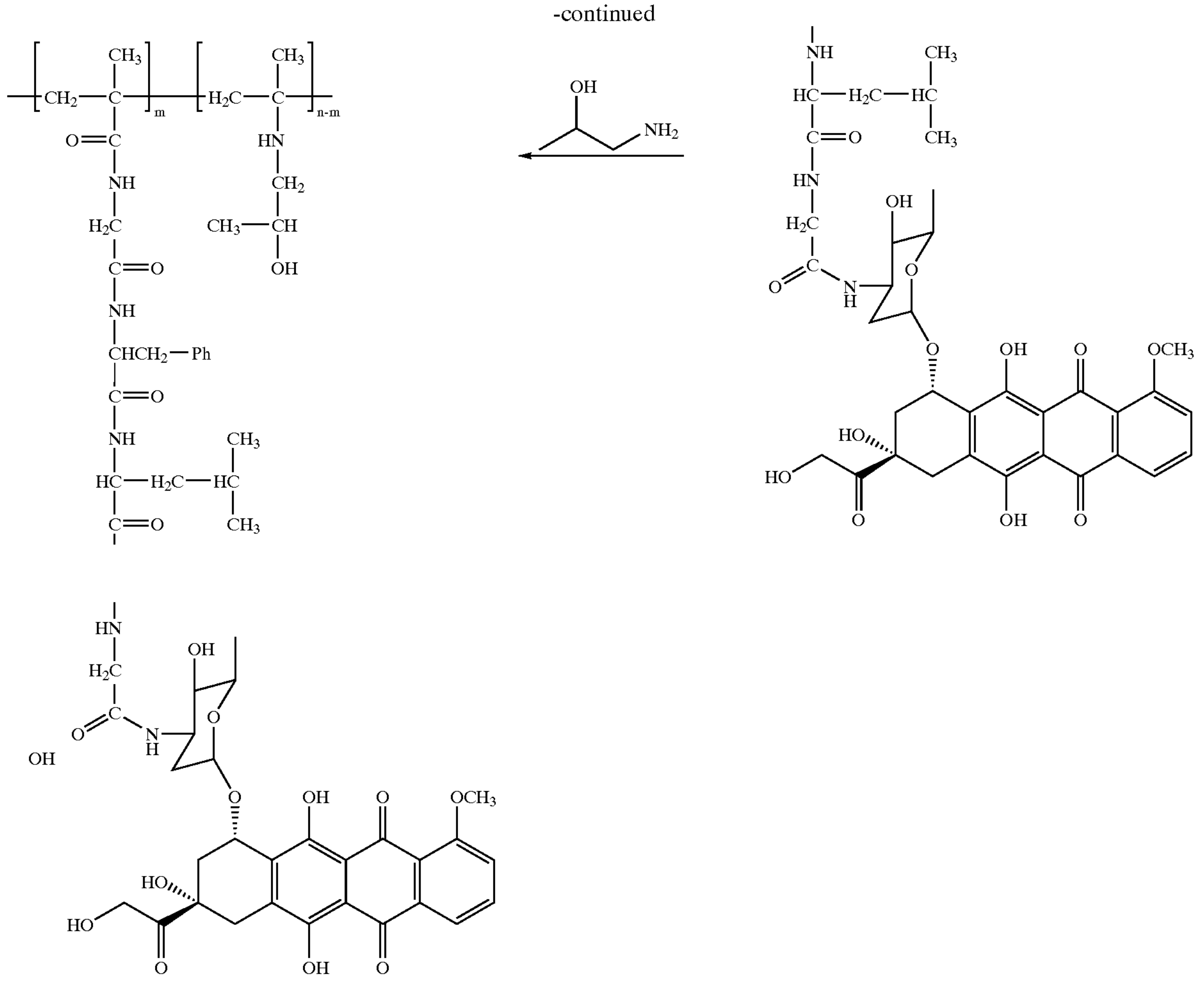

n is an integer in the range of 1 to 500 and m is the number equivalent of pendent moieties reacted with the activated polymer.

CRP processes are known to result in the presence of dormant initiating moieties at the chain ends of linear polymers. In particular the use of nitroxide mediated radical polymerization may be used to prepare narrow molecular weight distributed block copolymers. This allows more defined introduction of drug conjugating pendent chains in the polymer. Outlined in Scheme 2 is an example of this approach to prepare a block copolymer precursor using the CRP process known as nitroxide mediated polymerization (NMP).

Scheme 2

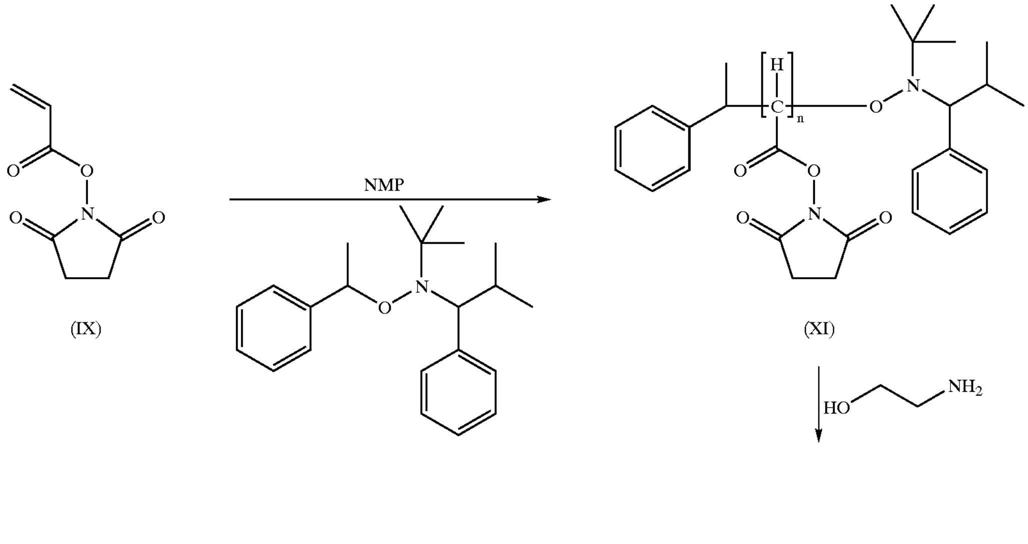

-continued

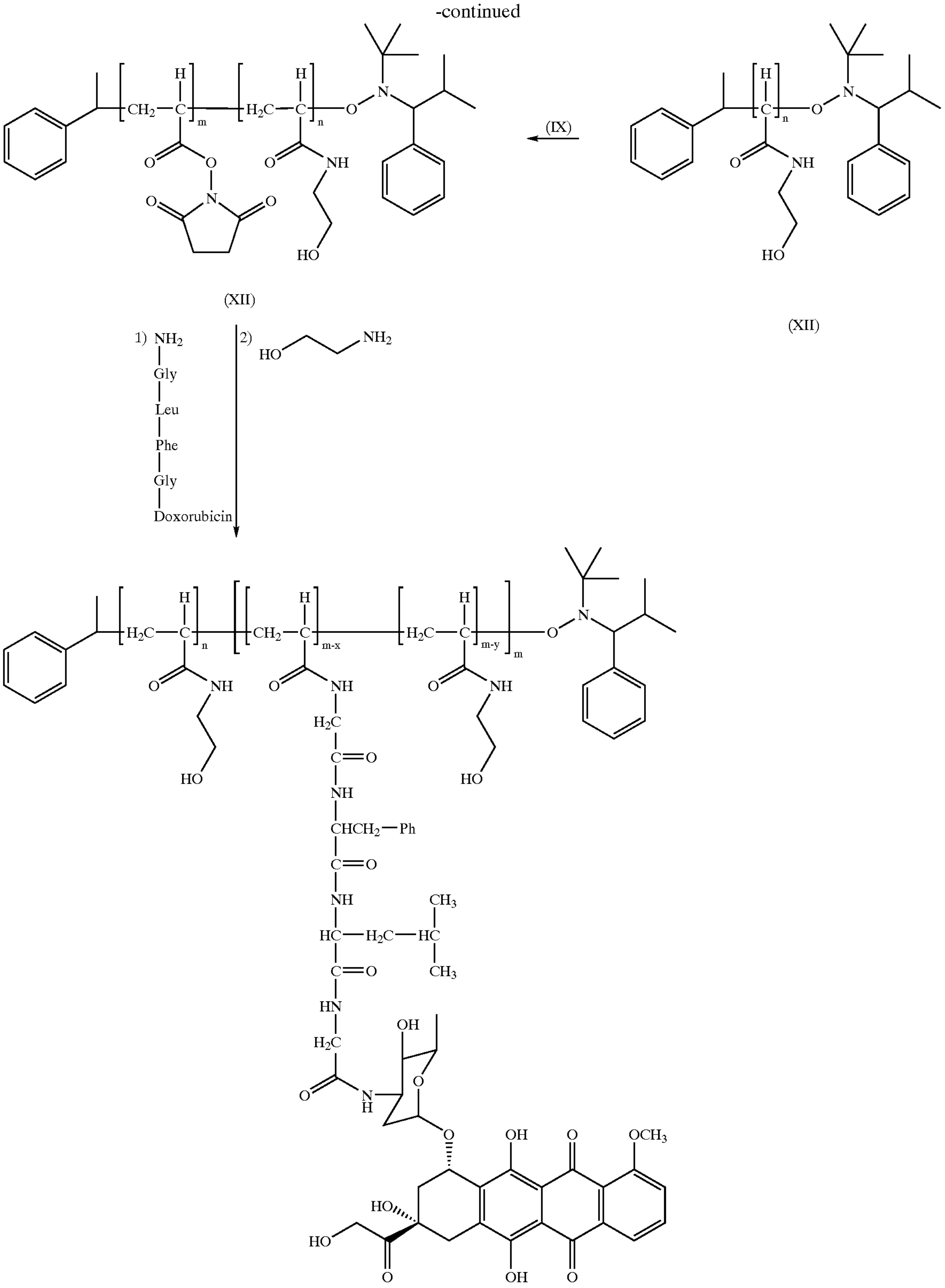

(XII)

(XII)

(XIV)

wherein x and y are the number equivalent of the pendent moiety and quenching group respectively.

Thus, polymeric precursors (XI) and (XIII) are designed to be used as polymeric precursors for polymer analogous reactions that are driven to completion to prepare conjugates with narrow molecular weight distributions and with differing m and n repeat structure. Drug conjugation would be localized only in the n repeat structure. Again it is possible to vary the solubilising pendent chain and the drug conjugating pendent chain starting from the polymeric precursor (XI). Defining the location of the drug conjugating pendent chains is necessary to develop more defined polymer-drug conjugates. The extent and location of drug loading and its influence on polymer solution properties is an important, and yet poorly understood phenomenon and will have a fundamental effect on the in vivo properties of therapeutic polymer-conjugates. Thus, this approach will find utility also in the development and optimization of polymer-drug conjugates.

EXAMPLES

Example 1

Figure 1:
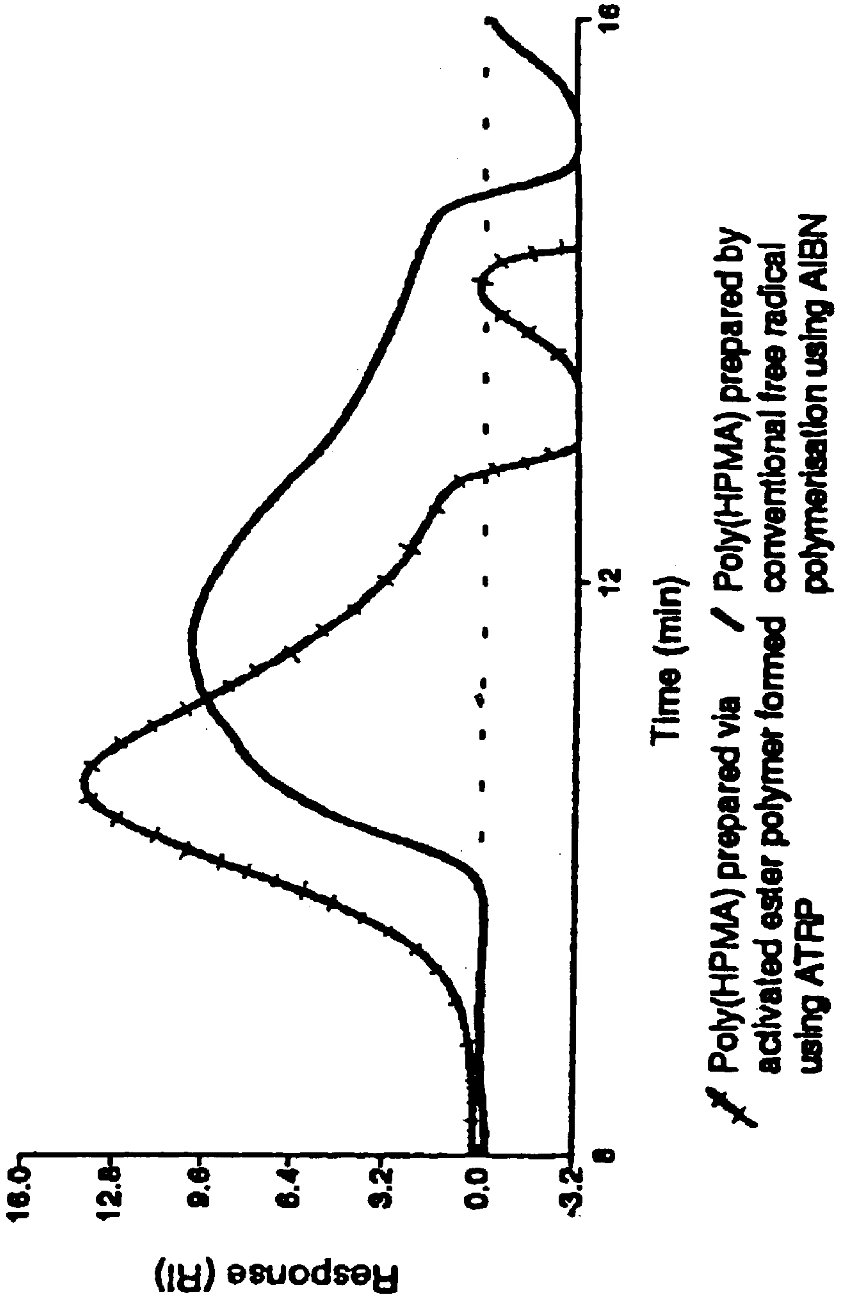
FIG. 1 shows that the broad molecular weight distribution associated with conventional free radical polymerization can be greatly improved using ATP.
Figure 2:
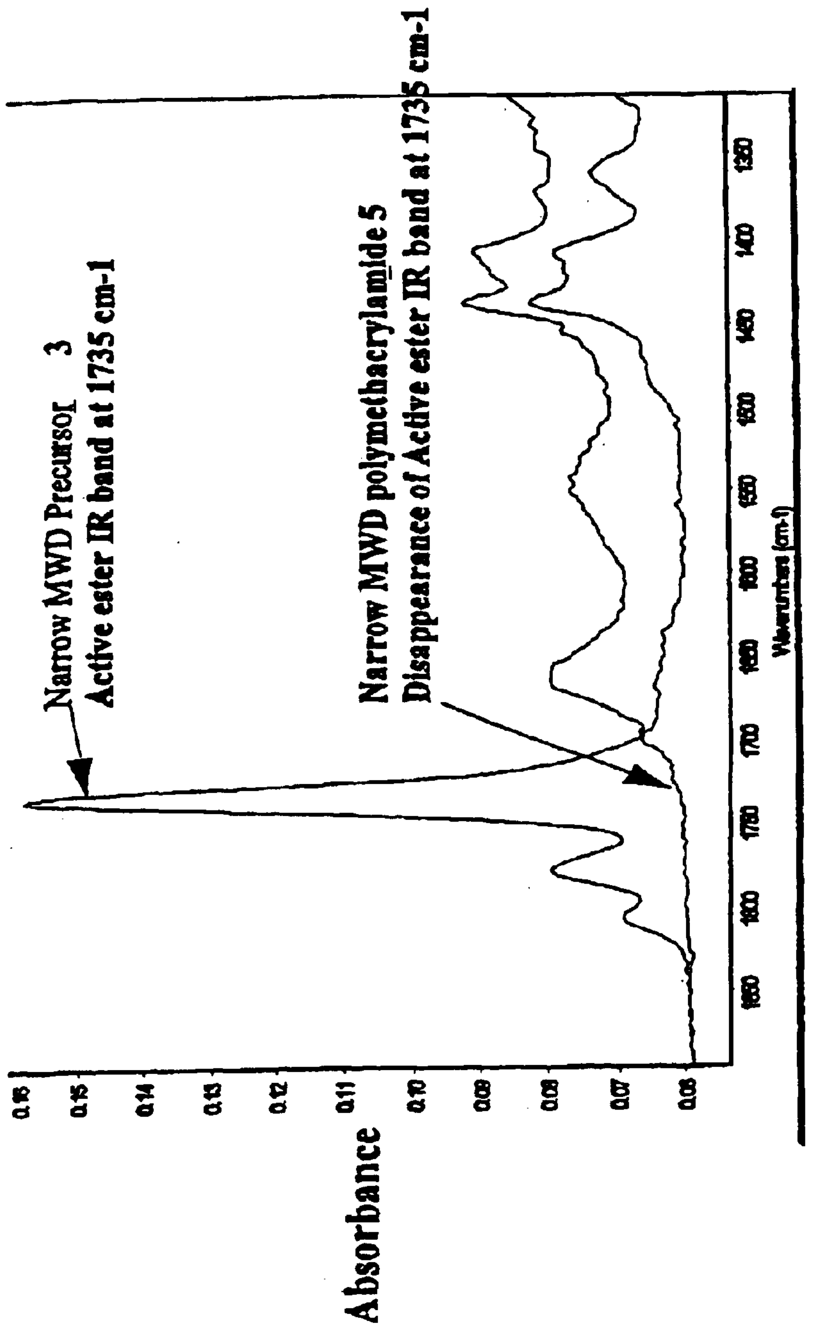
FIG. 2. Superimposed IR spectra of narrow MWD homopolymer precursor 3 before and after reaction with 1-amino-2-propanol.

Copper(I) bromide, pentamethyidiethylene ligand, an initiator having the structure, and 2-bromo-2-methyl-(2-hydroxyethyl)propanoate and monomer (IX) were added to THF solvent is a glass flask. The resulting solution was purged with nitrogen to remove oxygen. The flask was sealed and placed in an oil bath at 70° C. for 24 Hr. Samples were prepared for gel permeation chromatography by passing through a neutral aluminium oxide column to remove copper components. Analysis reveals the production of a polymer with a molecular weight of 20,000. A sample of this activated ester homopolymer was quenched with 1-aminopropanol, to give a water soluble polymer whose $^{1}H$ NMR spectrum was consistent with that of poly(HPMA). FIG. 1 compares the gel permeation chromatograms of HPMA homopolymer prepared from conventional free radical polymerization with that of 1-aminopropanol quenched poly(methacryloylsuccinimide) prepared using atom transfer radical polymerization.

Example 2

Synthesis of narrow molecular weight distribution (MWD) homo-polymeric precursor 3. (A) Homopolymerization in dimethylsulfoxide (DMSO) and dimethylformamide (DMF) and (B) Polymerisation in tetrahydrofuran (THF) and acetone.

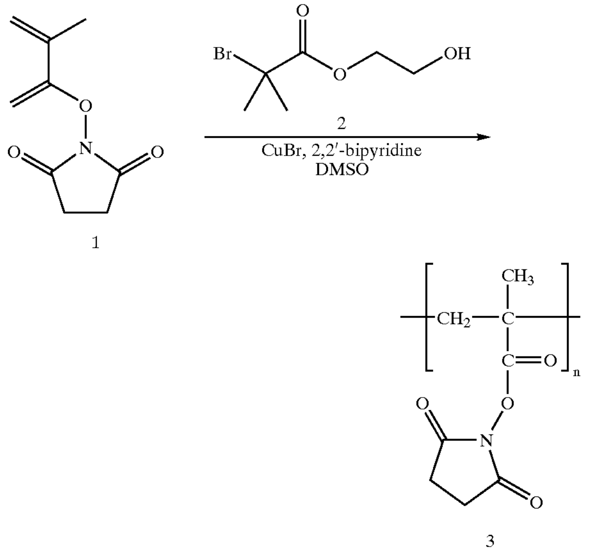

Synthesis of Methacryloxysuccinimide 1

To N-hydroxysuccinimide (6.6 g, 57 mmol) in dichloromethane (12 ml) was added dropwise a dichloromethane (12 ml) solution of methacryloyl chloride (6.0 g, 57 mmol) simultaneously with a dichloromethane solution (12 ml) of triethylamine (5.8 g, 57 mmol) maintaining the temperature below 5° C. After complete addition the reaction mixture was further stirred for 1 h and then washed with aqueous sodium hydrogen carbonate (0.1 M) and water (×3). The organic phase was then isolated and dried with magnesium sulfate. The solvent was removed to leave a white solid product which was recrystalised from ethyl acetate:hexane. Mass 8 g, m.p.=102° C.

($^{1}H$, 500MHz, DMSO-$d_6$): 2.00 (3H, s, $CH_3$), 2.84 (4H, s, $(CH_2)_2$), 6.09 (1H, s, $=CH_2$), 6.34 (1H, s, $=CH_2$).

(A) Homogeneous Polymerisation in DMSO: Synthesis of Homopolymeric Precursor—Poly (methacryloxysuccinimide) (1→3).

In a typical copper mediated polymerisation using DMSO as solvent at the preferred weight concentration of 56% in monomer 1, copper(I)bromide (31.3 mg, 0.2 mmol), 2–2'-bipyridine (Bpy) (68.3 mg, 0.4 mmol) and monomer 1 (2.00 g, 10.9 mmol) were added to a round bottomed flask which was then sealed with a septum. Into the flask was then injected DMSO (1.3 g). The resulting brown mixture was gently heated until a solution had formed and then purged with argon for approximately 5 min. An argon purged solution of 2-bromo-2-methyl-(2-hydroxyethyl)propanoate 2 (46.1 mg, 0.2 mmol) in DMSO (0.2 g) was then injected into the mixture and the flask was heated to 100° C. in an oil bath. The reaction mixture became viscous after a few minutes and was removed from the heat after 10–15 minutes and rapidly cooled. The polymeric product was isolated by addition of 7–8 ml of DMSO to dissolve the crude product mixture which was slowly added to a stirred solution of acetone (100 ml) to precipitate homopolymeric precursor 3 as a white solid. The acetone solution turned a green colour during the precipitation of polymer 3 due to the dissolution of copper species and the ligand. Atomic absorption analysis indicated the copper content in polymer 3 when at a concentration of 28.0 mg/ml in DMF to be 0.153 ppm. Precipitation of polymer 3 from the DMSO reaction solution into acetone may offer a viable alternative to alumina chromatography which has been typically used in copper mediated polymerisations to remove of copper from the product polymer. The isolated yield of polymer 3 was 1.78 g (89%). The number average molecular weight was 22,700 g/mol and polydispersity index was 1.20. Apparent molecular weights and molecular weight distributions for poly (methacryloxy succinimide) 3 were determined using Waters Styragel HR4 and HR3 (7.3x300 mm) columns coupled to a Gibson 133 refractive index detector, poly (methyl methacrylate) PMMA calibration standards and DMF with 0.1% LiCl eluent.

Polymerisations were conducted with different ratios of monomer 1 and initiator 2 to give narrow MWD homopolymeric precursors 3 with different molecular weights. These experiments are listed in Table 1 and have been conducted on reaction scales ranging from 26 g in methacryloxysuccinimide 1. Note also these homogeneous polymerisation conditions in DMSO gave the polymer 3 in a matter of minutes (e.g. experiment 6 in Table 1 was quenched after 2 minutes to give a significant yield of narrow MWD polymer 3.

Polymerisations were conducted at temperatures ranging from 80–130° C. to maintain solution homogeneity at methacryloxysuccinimide 1 to solvent weight ratios spanning 33–91%. The preferred solvent was DMSO, but similiar results were obtained with DMF. The weight ratio of monomer 1 to polar solvent (DMSO or DMF) was critical for the outcome of the polymerization. In DMSO at weight ratios less than 56% monomer 1 (e.g. 50 and 41%) resulted in lower yields of polymer (52 and 40% respectively). At weight concentrations higher than 60% monomer 1 in DMSO, the polymerisation solution solidified. Likewise in DMF, the weight concentration of monomer was critical for the outcome of the polymerisation reaction, however the maximal yield in DMF was less than in DMSO. A 50% yield of polymer 3 was isolated at monomer 1:DMF weight ratio of 61%. No polymer was isolated when the reaction was conducted at a monomer 1 weight ratio of 33%. At higher monomer weight concentrations (above 75%), the reaction mixture solidified.

TABLE 1

| Experiment | 1:2:CuBr:Bpy[a] | T, ° C. | Yield, % | $\overline{M}_n$ | $\overline{M}_w/\overline{M}_n$ |
|---|---|---|---|---|---|
| 1 | 10:1:1:2 | 100 | 85 | 12500 | 1.17 |
| 2 | 20:1:1:2 | 80 | 92 | 16800 | 1.15 |
| 3 | 50:1:1:2 | 100 | 89 | 22700 | 1.20 |
| 4 | 100:1:1:2 | 100 | 96 | 29000 | 1.14 |
| 5 | 150:1:1:2 | 110 | 80 | 40700 | 1.13 |
| 6[b] | 100:1:1:2 | 100 | 49 | 23330 | 1.15 |

(a)Ratio of initial monomer and initiator concentrations.
(b)Reaction stopped after 2.5 minutes by dilution with DMSO and rapid cooling.

(B) Polymerisation in THF and Acetone

Copper mediated polymerisations of monomer 1 in solvents such as THF, ethyl acetate and acetone also gave narrow MWD polymer 3. Yields ranged from 10–95% depending on the polymer molecular weight. At molecular weights above 10,000 g/mo the yields which was less than that observed when the polymerisation was conducted in DMSO or DMF. The lower yields occured because of premature precipitation of polymer 3. Exemplary copper mediated polymerisations using 0.5 g in monomer 1 were conducted in THF over a 16 h time period at 70° C. The copper chelating ligand used in these THF reactions was N,N,N',N",N"-pentamethyidiethylenetriamine (PMDETA).

TABLE 2

| Experiment | 1:2:CuBr:PMDETA[a] | $\overline{M}_n$ | $\overline{M}_w/\overline{M}_n$ |
|---|---|---|---|
| 1 | 100:1:1:1.2 | 14800 | 1.1 |
| 2 | 200:1:1:1.2 | 1800 | 1.12 |
| 3 | 100:1:0.3:1.2 | 13100 | 1.09 |

(a)Ratio of initial monomer and initiator concentrations.

Copper mediated polymerisation in acetone gave a 95% yield of polymer 3 when a 1:2:CuBr:Bpy ratio of 55:1:1:2 was used. When this ratio was changed to 100:1:1:2 a 30% yield of polymer 3 was obtained.

Example 3

Hydrolysis of the Narrow MWD Homopolymeric Precursor 3 to give Narrow MWD Poly(methacrylic acid) PMAA Sodium Salt 4

Determination of the absolute molecular weight of PMM 4 by GPC-this gives the degree of polymerisation (DP) which can be used to give the absolute molecular weight of the homopolymeric precursor 3 and polymers derived from precursor 3.

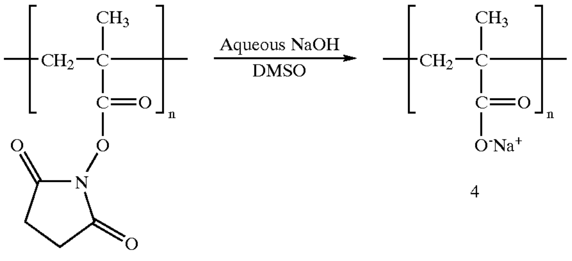

3 4

A sample of the polymeric precursor, poly (methacryloxysuccinimide) 3 (apparent number average molecular weight of 24,800 g/mol; polydispersity index of 1.20; determined by GPC using DMF eluent and PMMA calibration standards) was hydrolyzed to poly(methacrylic acid) (PMM) sodium salt 4 to demonstrate how the precursor 3 can be utilised to prepare narrow MWD PMM sodium salt 4 and to obtain a better indication of the absolute molecular weight of 3. It is critical to obtain knowledge of the absolute molecular weight of the precursor 3 because it is possible then to know the absolute molecular weight of any polymer derived from precursor 3. Poly (methacryloxysuccinimide) 3 (1 g) was dissolved in DMF (5 ml) and aqueous sodium hydroxide (0.66 g, 3 ml $H_2O$) was added dropwise causing precipitation of the polymer. The reaction vessel quickly became warm and a homogeneous solution followed. Water (3 ml) was added to the reaction solution and this was then heated at 70° C. for 24 h after which time further water (approx. 50 ml) was added. The solution was dialysed using regenerated cellulose membrane (SpectraPor, MWCO 2000) against water. Lyophilization of the dialysed solution gave a white solid product 4 (0.3 g) which had an infrared spectrum identical with a commercial sample of narrow MWD PMAA sodium salt. The molecular weight of PMAA sodium salt 4 was determined by GPC with phosphate buffer solution at pH 8.5 as eluent and PMAA sodium salt calibration standards. Since GPC calibration standards were the same as PMAA sodium salt 4 isolated by the hydrolysis of the precursor 3, the molecular weight which was obtained was an absolute molecular weight for polymer 4. The absolute number average molecular weight of PMAA 4 for this example was 22,000 with a polydispersity index of 1.20.

This value can be used to determine the degree of polymerization (DP) to know the number of repeat units for any polymer derived from 3. Since the repeat unit molecular weight of PMAA sodium salt 4 is 108, the DP for this sample was approximately 203 (i.e. 22,000 g/mol ÷108 g/mol). This means the DP for the precursor 3 is 203, and since the molecular weight of the repeat unit of precursor 3 is 183 g/mol, then the absolute number average molecular weight of precursor 3 in this example was 37,149 g/mol (i.e. 183 g/mol ’203). The value of 203 for the DP of precursor 3 can be used in an analogous fashion to determine the absolute molecular weight of polymers derived from 3.

Example 4

Conjugation of Amine to Narrow MWD Homopolymeric Precursor 3 to Produce Narrow MWD Polymethacrylamides. Reaction of Precursor 3 with 1-amino-2-propanol to Give Polymethacrylamide 5.

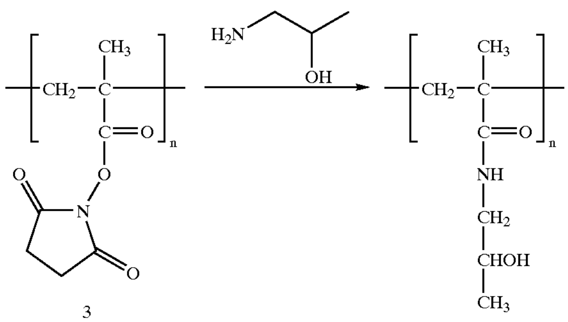

3 5

To poly(methacryloxysuccinimide) 3 (0.2 g, polydispersity index 1.2, GPC, DMF eluent, PMMA calibration standards) in DMF (3 ml) was added 1-amino-2-propanol (0.16 ml, 2.1 mmol) drop-wise under stirring at 0° C. The solution was allowed to warm to room temperature and then heated to 50° C. for 16 hr. The reaction mixture was cooled to room temperature and slowly added to acetone (20 ml) to precipitate a solid product. The product was further purified by a second precipitation from methanol into 60:40 (v/v) acetone:diethyl ether to give the water soluble polymethacrylamide 5 as a white solid (polydispersity index 1.3; GPC, phosphate buffer eluent, poly(ethylene glycol) calibration standards). The reaction of 1-amino-2-propanol was followed by IR. Shown in FIG. 1 is the are superimposed IR spectra showing the active ester IR band at 1735 $cm^{-1}$ in narrow MWD homopolymeric precursor 3 which disappears upon the addition of of 1-amino-2-propanol to give polymethacrylamide 5.

Figure 3:
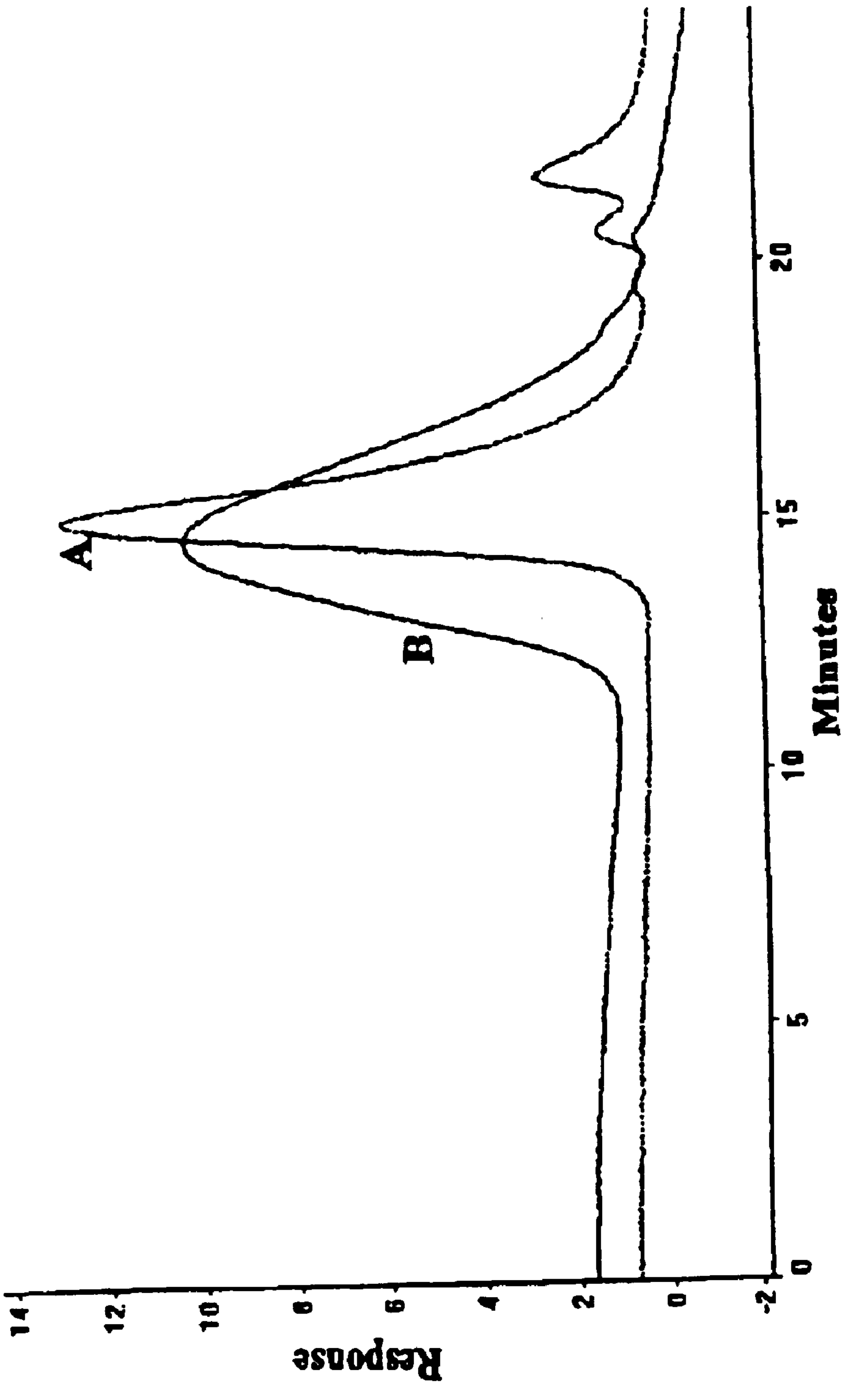
FIG. 3. The GPC for narrow MWD polymethacrylamide 5 (Labelled "A") derived from the reaction of precursor 3 and 1-amino-2-propanol (2.0 equivalents). The GPC labelled "B" was obtained for 5 that was prepared by conventional free radical polymerization in acetone using AIBN as initiator.
Figure 4:
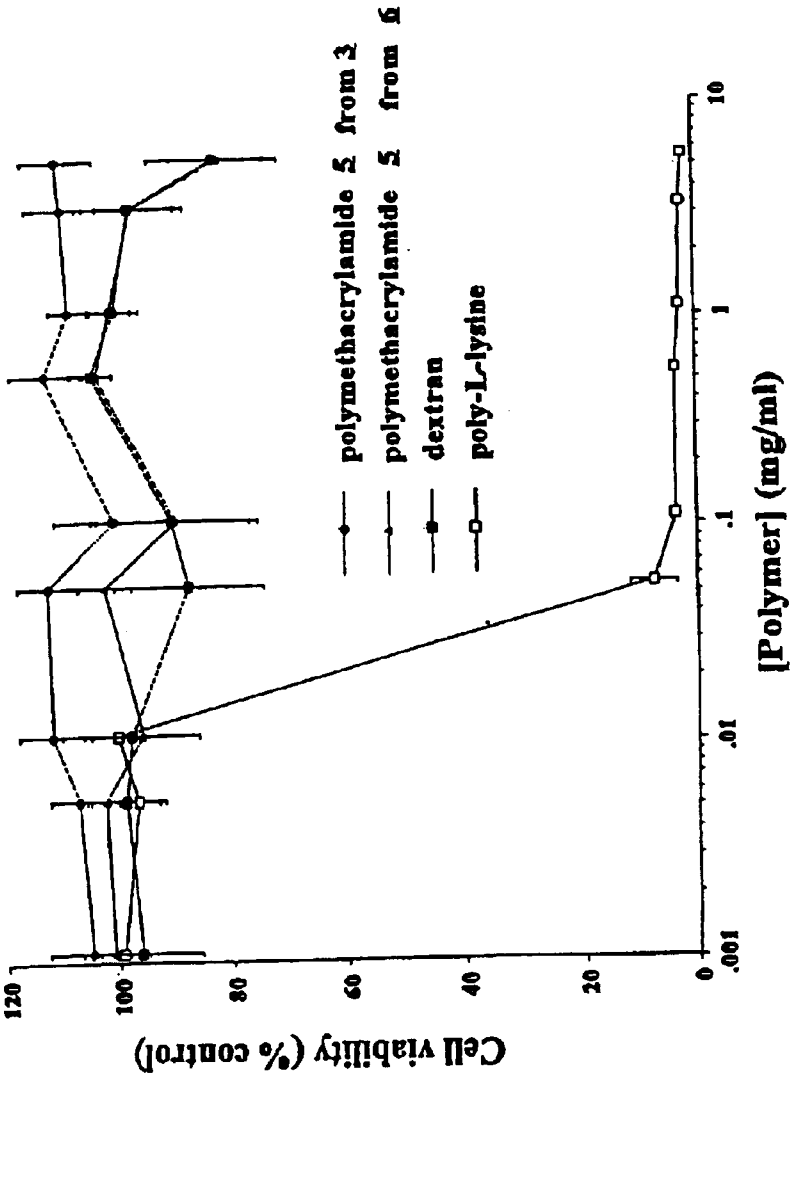
FIG. 4. Cytotoxicity assay using B16F10 cell line of narrow MWD polymethacrylamide 5 prepare from narrow MWD homopolymeric precursor 3 and polymethacrylamide 5 prepared by conventional free radical polymerisation of monomer 6.

FIG. 3 shows the GPC elutagramme of the narrow MWD polymethacrylamide 5 as obtained in this example from narrow MWD homopolymeric precursor 3 and is superimposed with the GPC elutagramme for polymethacrylamide 5 which was produced by conventional free radical polymerisation of 6. It is known that polymethacrylamide 5 when prepared from monomer 6 by conventional free radical polymerisation is not cytotoxic. FIG. 4 confirms that narrow MWD polymethacrylamide 5 prepared from precursor 3 is also not cytotoxic.

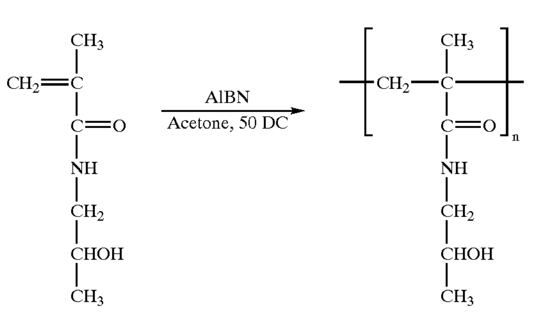

6 5

Both polymethacrylamide 5 samples do not display cyctoxicity in this assay compared to polylysine which is used as a cytotoxic control. Dextran is used as a noncytotoxic control.

Figure 5:
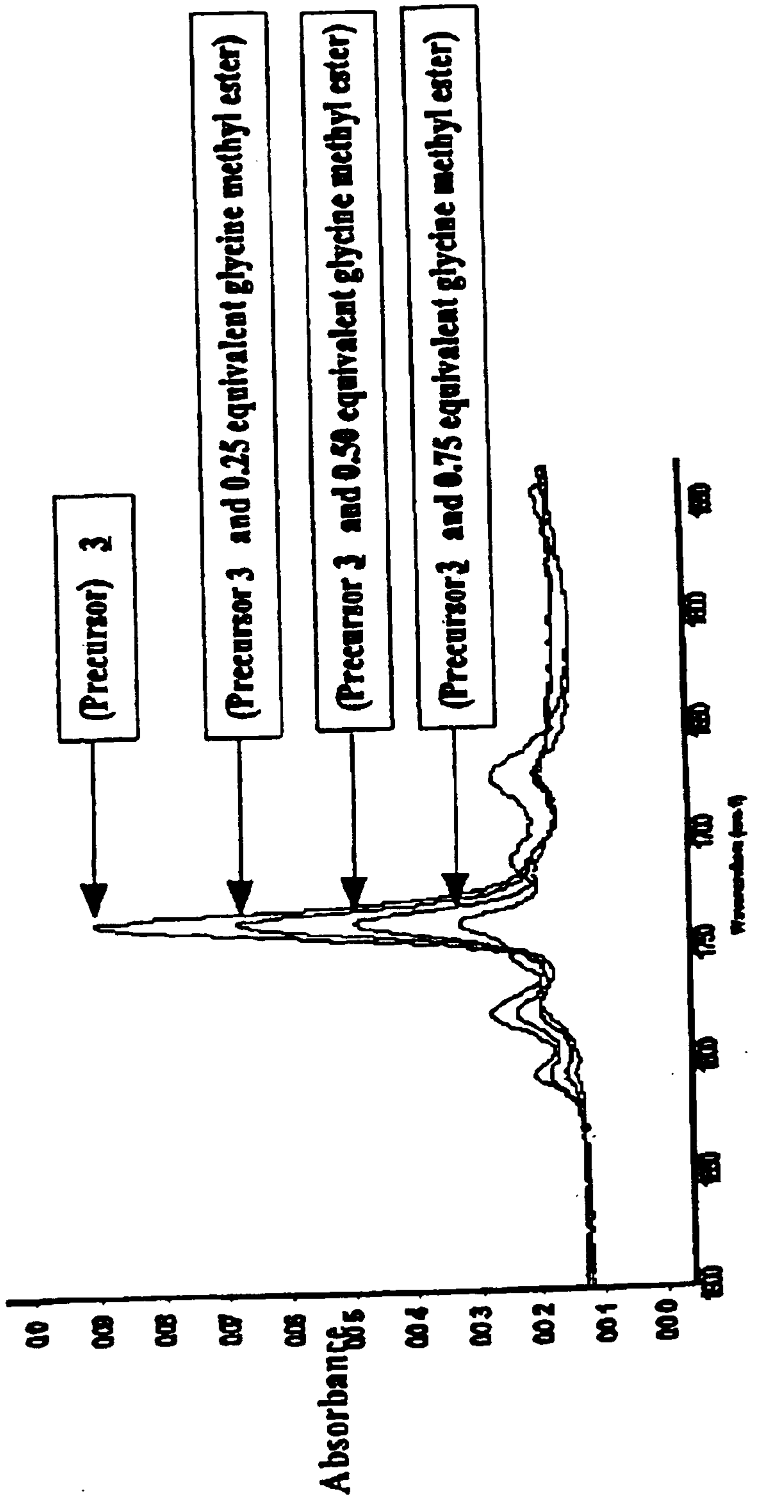
FIG. 5. Superimposed IR spectra in the absorbance mode for the sequence of reactions to produce narrow MWD copolymer conjugate 7.

Different amines including diethyl amine, propyl amine, and methyl esters of amino acids have been conjugated to narrow MWD homopolymeric precursor 3 to make homopolymeric narrow MWD polymethacrylamides. It is also possible to effectively conjugate less than an equivalent of the amine to give copolymers like 7 which is shown in FIG. 5 by a corresponding decrease of the IR band for the active ester in the precursor 3 at 1735 cm−1 as a function of the stoichiometry of the added amine (in the example shown below, glycine methyl ester).

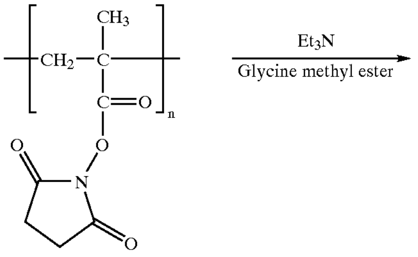

3

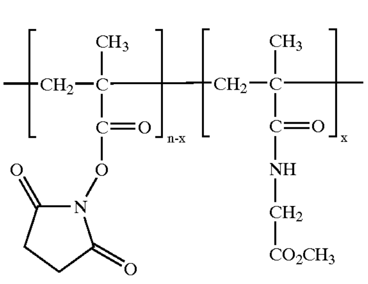

7

FIG. 5 shows superimposed IR spectra in the absorbance mode for the sequence of reactions to produce narrow MWD copolymer conjugate 7 derived from the reaction of narrow MWD homopolymeric precursor 3 with the different the stoichiometries that are shown of glycine methyl ester. Actual active ester peak height reductions at 1735 $cm^{-1}$ were 25.7, 53.7 and 74.7% corresponding to the increasing stoichiometries of 0.25, 0.50 and 0.75 equivalents respectively of glycine methyl ester. This experiment demonstrates the ability to monitor the conjugation of different stoichiometries of amines to narrow MWD homopolymer precursor 3. The experiment below demonstrates the ability to use the narrow the MWD homopolymeric precursor 3 to prepare narrow MWD copolymeric poly(methacrylic acid co methacrylamides) 9.

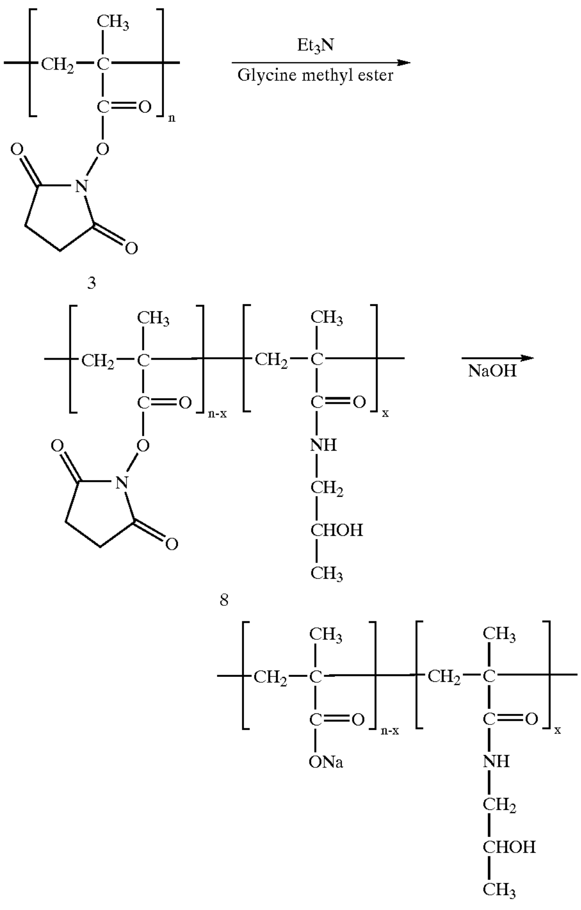

3, 8, 9

Procedure

Figure 6:
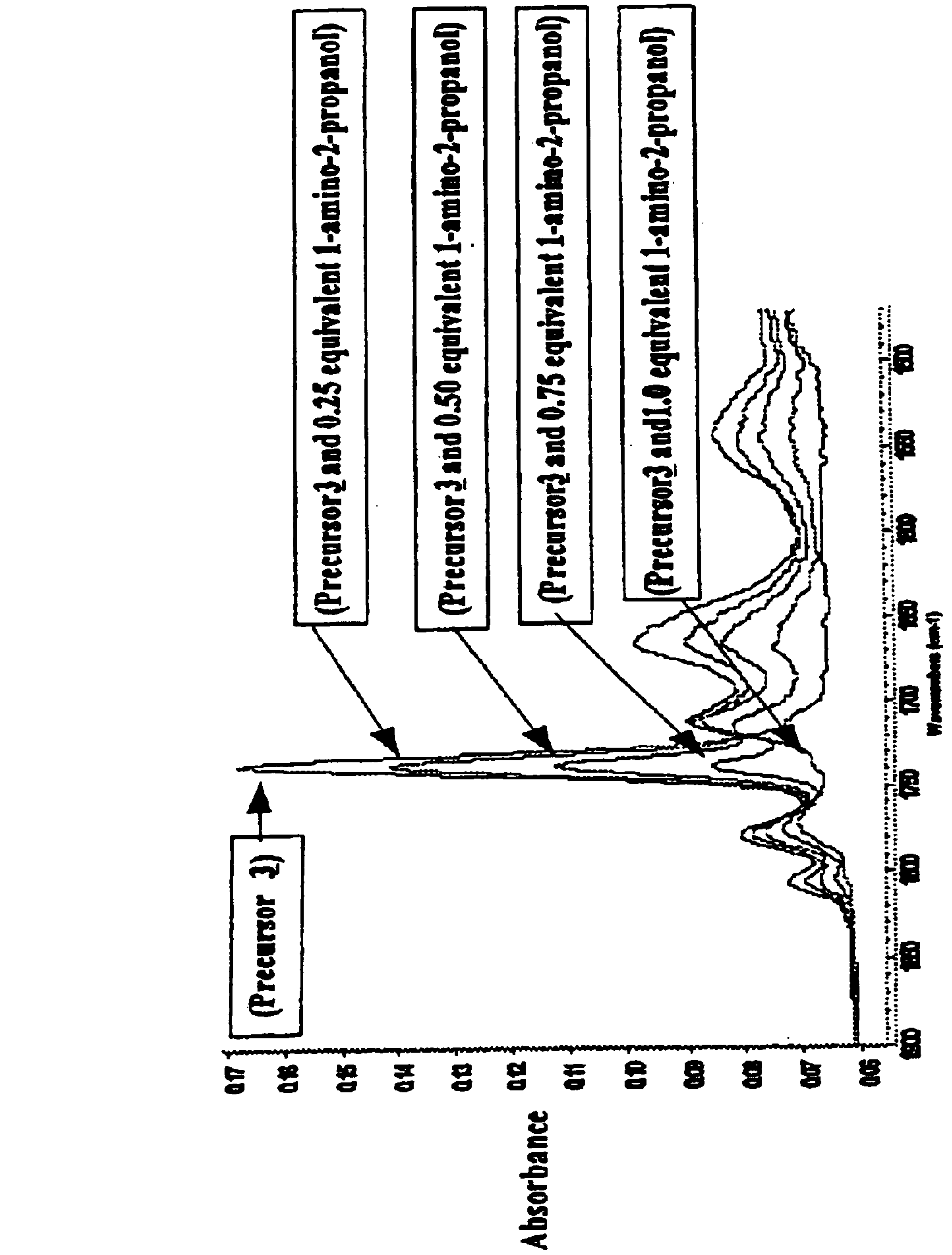
FIG. 6. Superimposed IR spectra in the absorbance mode for the sequence of reactions to produce the intermediate narrow MWD copolymer conjugate 8.

To an argon purged vial containing the narrow MWD homopolymeric precursor, poly(methacryloxy succinimide) 3 (0.3 g, 1.6 mmol of reactive groups) in DMSO (1 ml) was added 1-amino-2-propanol (In three separate reactions; 0.25 eq, 32 ml, 4.1 mmol; 0.5 eq., 63 ml, 8.2 mmol and 0.75 eq., 95 ml, 12.2 mmol) dropwise under stirring. The vials were then heated at 50° C. for 3 hr and a FT-IR spectrum taken of each reaction solution to confirm that the expected amount of 1-amino-2-propanol was conjugated to precursor 3 to give the copolymeric intermediate 8 (FIG. 6). To the reaction solution was then added aqueous NaOH (1.6 ml, 1N). The solution became warm upon addition and soon became less viscous. Hydrolysis was confirmed by the disappearance of the active ester band at 1735 $cm^{-1}$ by IR spectroscopy. After 5 h of stirring, water (approx. 50 ml) was added and the solution was dialysed using regenerated cellulose membrane (SpectraPor, MWCO 2000) against water. Lyophilization of the dialysed solution gave the narrow MWD copolymeric poly(methacrylic acid co methacrylamides) 9 as white solid products. Mass=0.22 g, 0.23 g and 0.2 g respectively.

FIG. 6 shows superimposed IR spectra in the absorbance mode for the sequence of reactions to produce the intermediate narrow MWD copolymer conjugate 8 derived from the reaction of narrow MWD homopolymeric precursor 3 with the different the stoichiometries that are shown of 1-amino-2-propanol. Actual active ester peak height reductions at 1735 $cm^{-1}$ were 26.0, 52.9 and 76.4% corresponding to the increasing stoichiometries of 0.25, 0.50 and 0.75 equivalents respectively of 1-amino-2-propane. This figure also shows the reduction of the active ester band from the addition of 1 equivalent of 1-amino-2-propanol. The actual reduction was 99.9%. This experiment again demonstrates the ability to monitor the conjugation of different stoichiometries of amines to narrow the MWD homopolymer precursor 3 with the added advantage of being able to chemically functionalise copolymeric intermediates 8 to give functionalised narrow MWD poly(methacrylic acid co methacrylamides) 9.

Example 5

Use of Narrow MDW Homopolymeric Precursor 3 to Prepare Water Soluble Copolymeric Conjugates The preparation of water soluble conjugate 12. The letter G in structures 11 and 12 is the conventional single letter abbreviation for glycine.

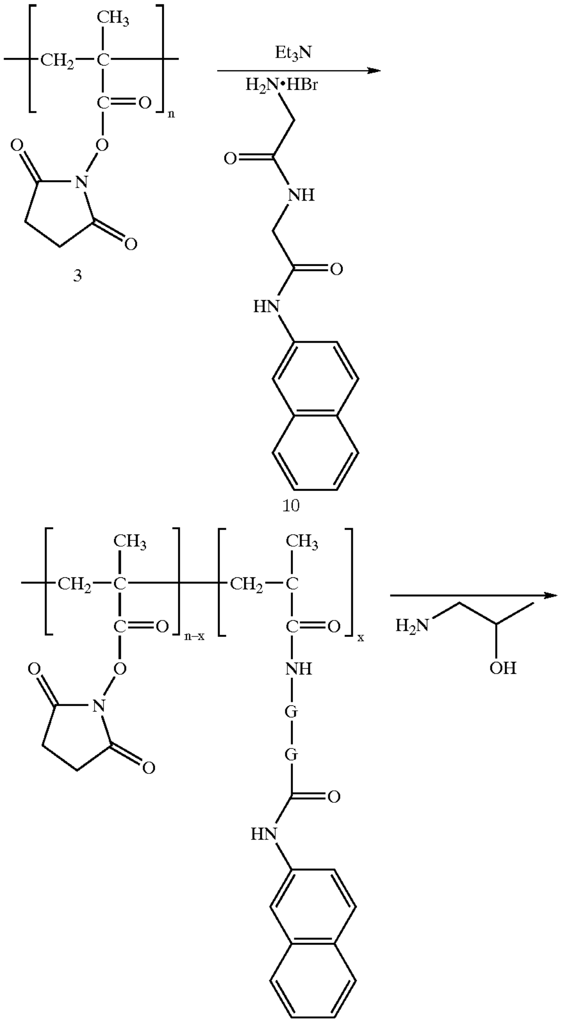

3, 10, 11

-continued

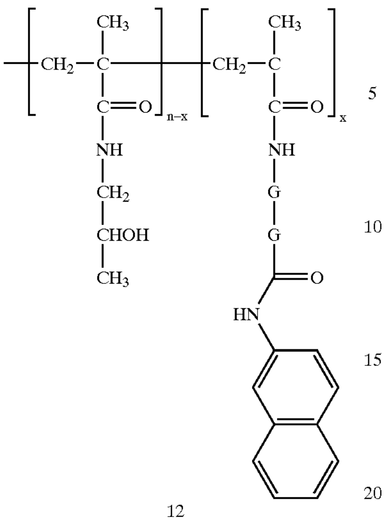

12

Poly(methacryloxysuccinimide) 3 (100 mg, 0.55 mmol of reactive groups), the model drug derivative, H-Gly-Gly-β-napthylamide HBr0.6$H_2O$ 10 (19 mg, 0.06 mmol, 0.1 eq., 10% loading) and a magnetic flea were added to a 1.5 ml vial. The vial was sealed with a septum centred screw cap lid and purged with argon for approximately 2 min. DMSO (0.4 ml) was then injected into the vial under argon and the vial was placed onto a magnetic stirrer. Once a solution had formed, a small sample of the solution was removed by syringe under argon for immediate FT-IR spectroscopy. Triethylamine (15.2 ml, 0.11 mmol, 2 salt eq.) was then added under argon to the vial and the vial was placed in an oil bath at 50° C. for 2 h 30 min. After cooling, a sample of the solution was removed from the vial under argon for immediate FT-IR spectroscopy to confirm the addition of 10 by ensuring the corresponding 10% reduction in the active ester peak at 1735 $cm^{-1}$ had occurred. To the reaction solution containing the copolymer intermediate 11 was added 1-amino-2-propanol (82 mg, 1.1 mmol, 2 eq.) and the solution heated at 50° C. for 1 h 15 min. The water soluble copolymeric conjugate 12 was isolated by precipitation of the DMSO reaction solution into acetone:diethyl ether (50:50 v/v) and further purified by precipitation from methanol into acetone:diethyl ether (50:50 v/v).

Figure 7:
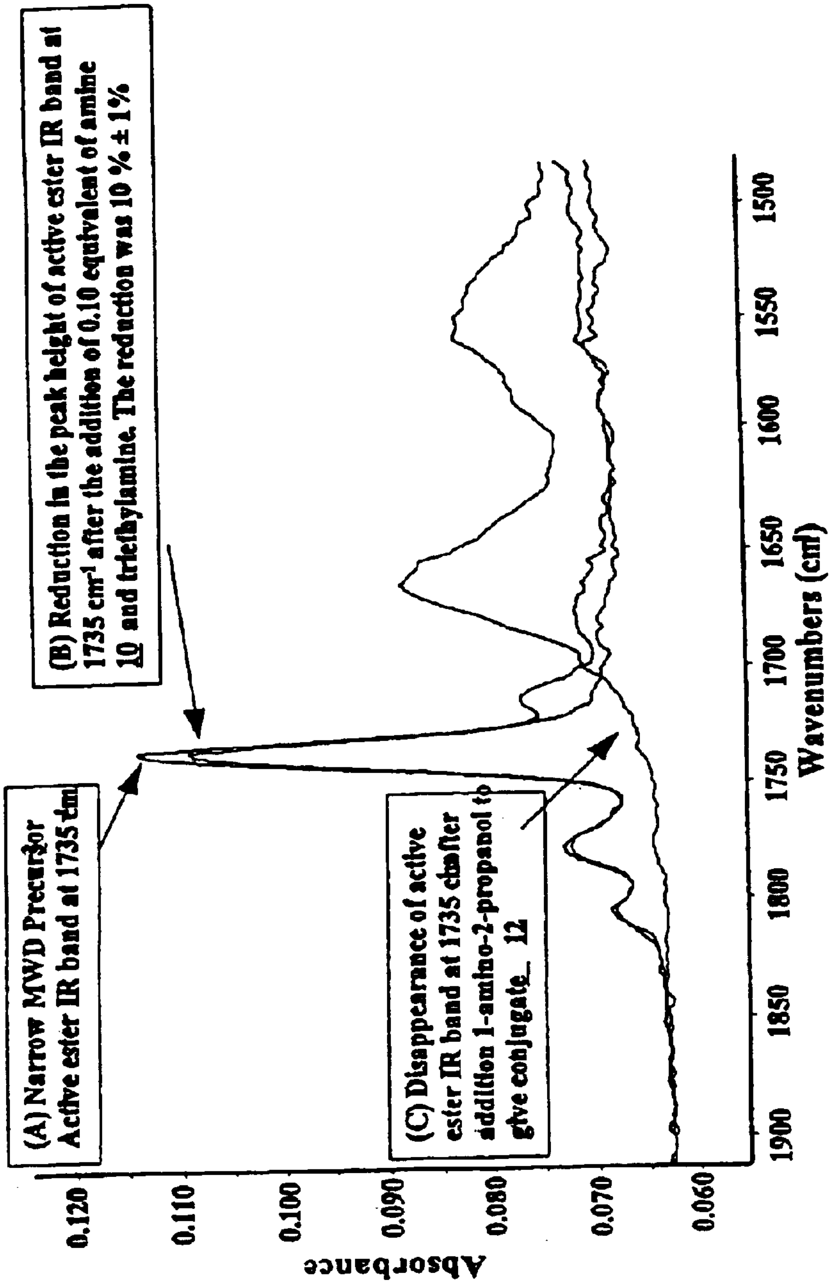
FIG. 7. Superimposed IR spectra displaying the changes in the active ester peak during this sequence of reactions to prepare conjugate 12.

Shown in FIG. 7 are the superimposed IR spectra to display the changes in the active ester peak during this sequence of reactions to prepare conjugate 12. These 3 IR spectra display the reduction of the height of the active ester band at 1735 $cm^{-1}$ and the evolution of the amide I and II peaks. Spectrum (A) is the starting precursor 3, spectrum (B) shows the 10% reduction in the height active ester band after addition of 10, and spectrum (C) shows the complete disappearance of the active ester band after the addition of 1-amino-2-propanol to give the narrow MWD copolymeric conjugate 12 with 10% loading of 10.

Figure 8:
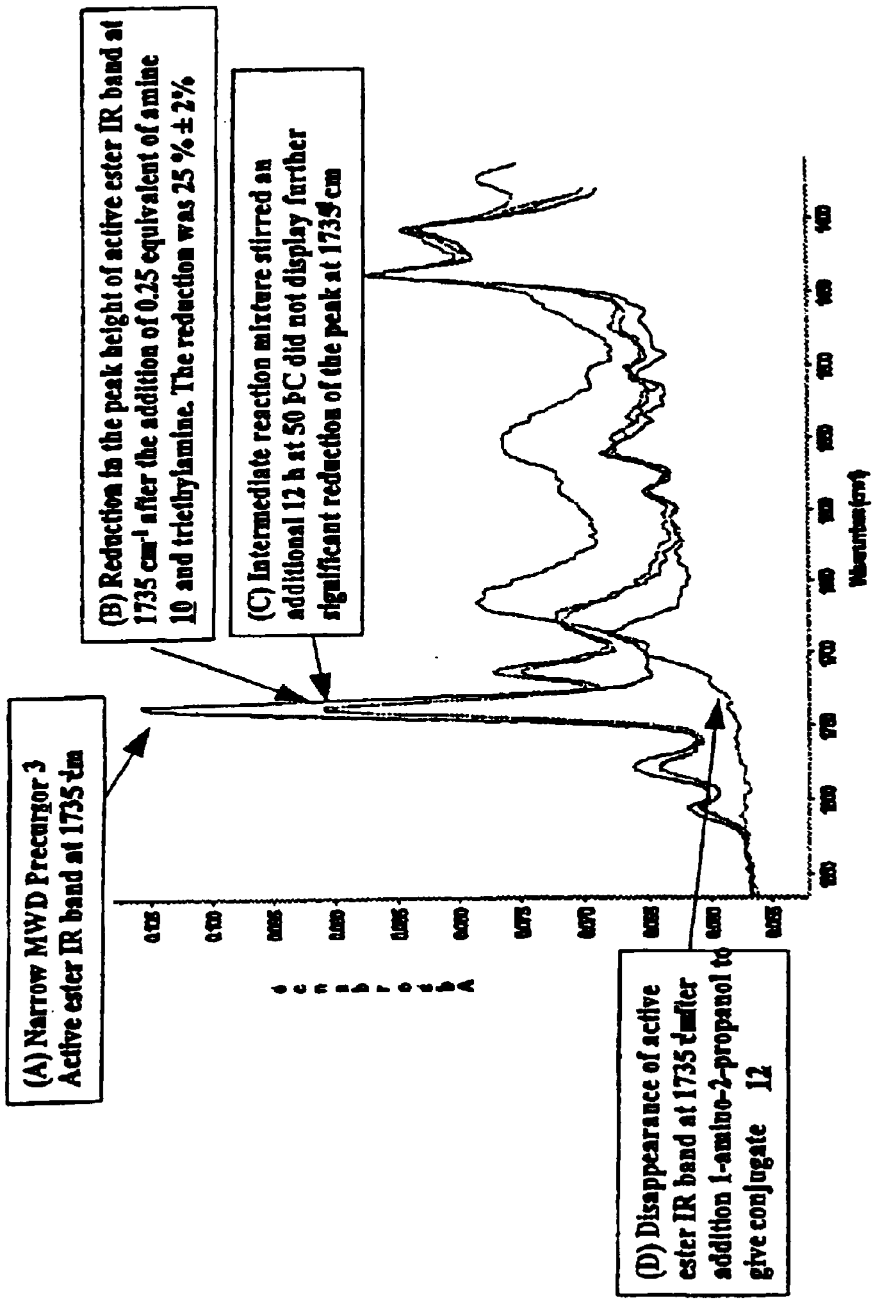
FIG. 8. Preparation of narrow MWD conjugate 12 at 25% loading of 10.

Shown in FIG. 8 are the superimposed IR spectra for the same reaction sequence to prepare conjugate 12. This experiment demonstrated the ability to use the same narrow MWD homopolymeric precursor 3 to prepare conjugates with different loadings of the drug component. In this experiment 0.25 equivalents of amine 10 were used instead of 0.1 equivalents and the peak at 1735 $cm^{-1}$ displayed a height reduction of approximately 25%. To confirm there was essentially no competing hydrolysis reactions, the intermediate reaction solution was allowed to continue stirring a further 12 hours at 50° C. to ensure no further reduction of the active ester peak occurred.

FIG. 8 shows the preparation of narrow MWD conjugate 12 at 25% loading of 10. Spectrum (A) is the starting precursor 3, spectrum (B) shows the 25% reduction in the height active ester band at 1735 $cm^{31}$ after addition of 10, spectrum (C) shows there is no further reduction in the height active ester band when the intermediate reaction mixture of 11 was stirred a further 12 h at 50° C. and spectrum (D) shows the complete disappearance of the active ester band after the addition of 1-amino-2-propanol to give the narrow MWD copolymeric conjugate 12 with a 25% loading of 10.

Figure 9:
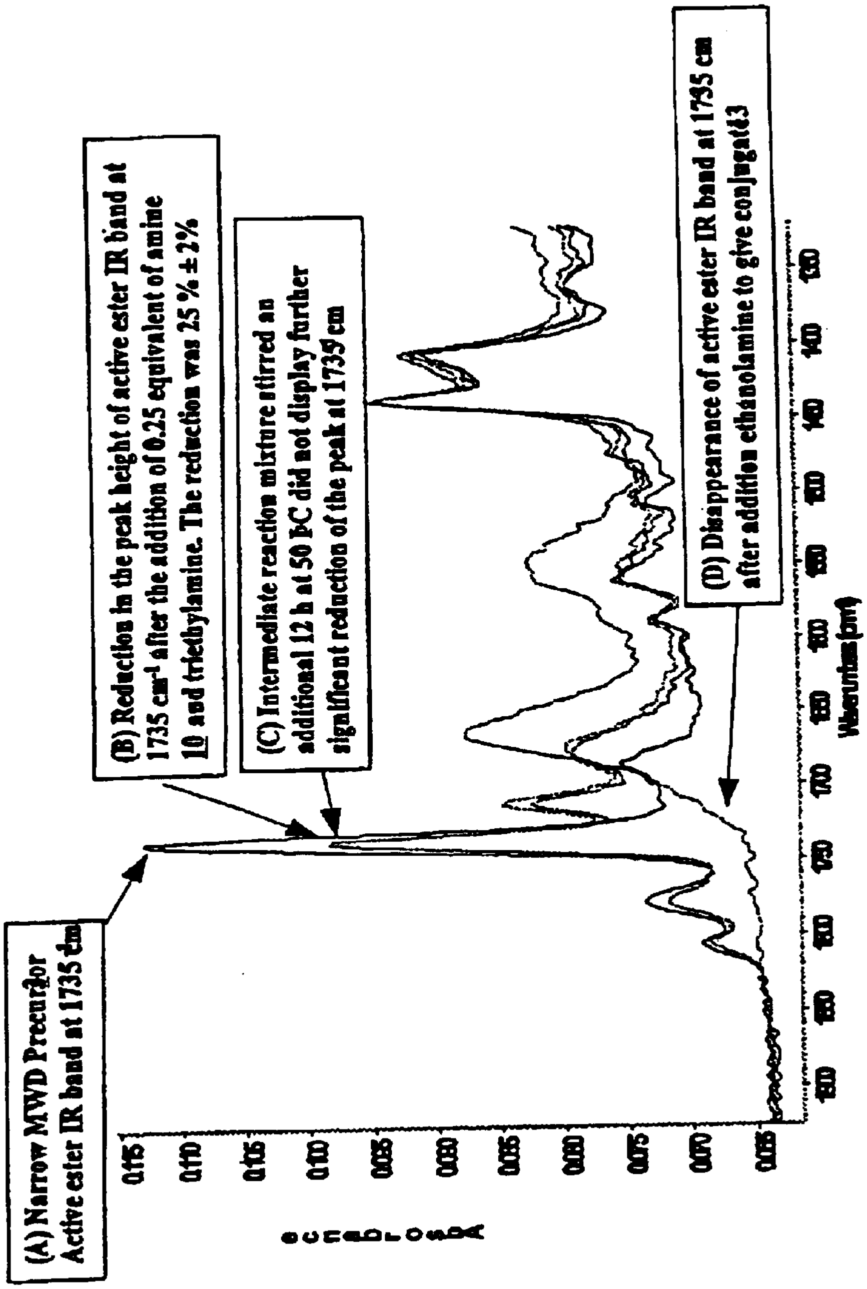
FIG. 9. Preparation of narrow MWD conjugate 13 at 25% loading of 10.
Figure 10:
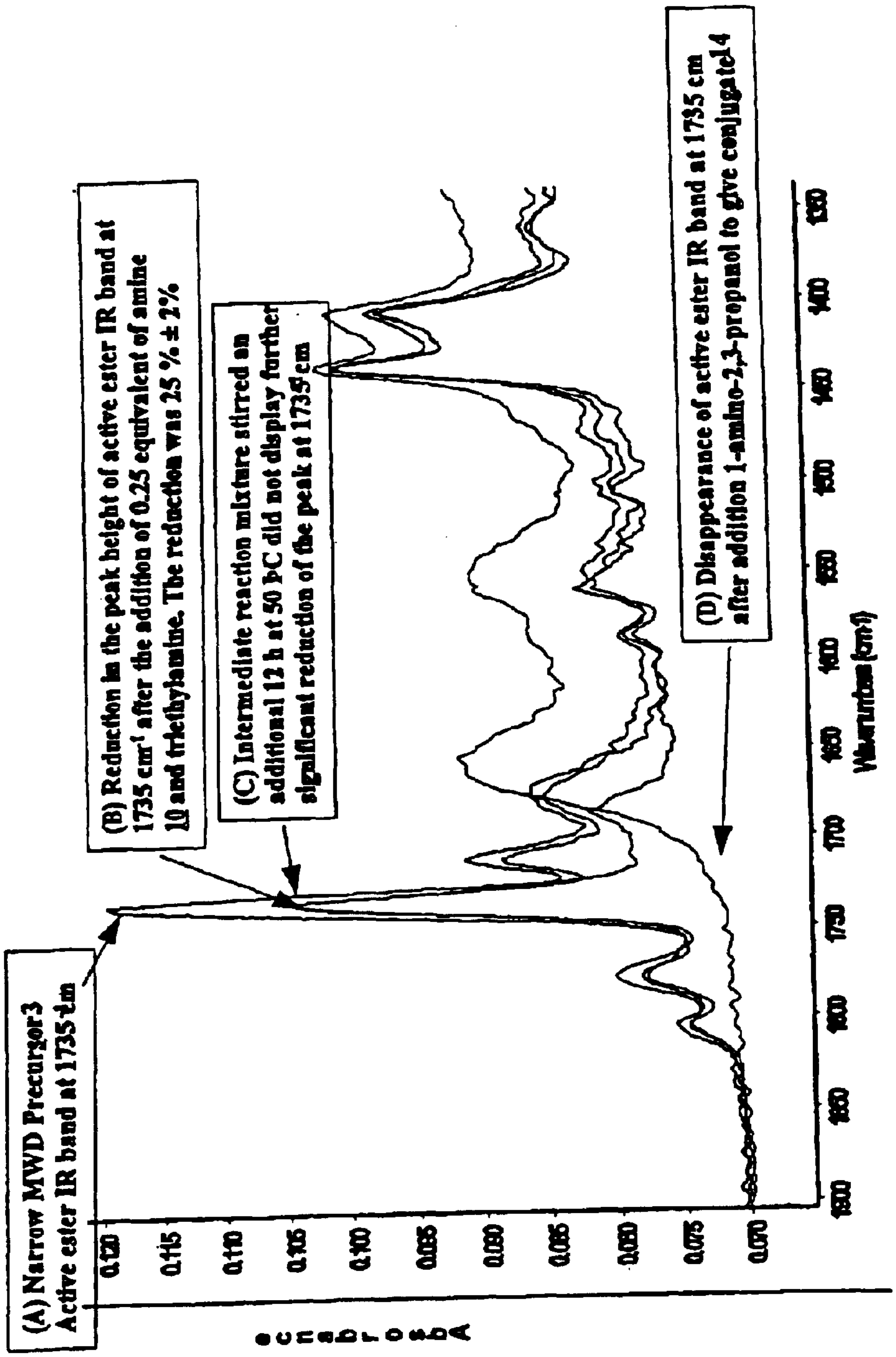
FIG. 10. Preparation of narrow MWD conjugate 14 at 25% loading of 10.

The sequence of reactions for example 5 was also carried out using a different amine for the second step. This exemplifies the concept that using the same narrow MWD homopolymeric precursor 3 it is possible to conjugate different property modifying pendent chain molecules to give conjugates that will have different solution properties. The two reaction sequences shown below used aminoethanol and 1-amino-2,3-propane-diol respectively instead of 1-amino-2-propanol for the second conjugation reaction in the sequence. FIGS. 9–10 show the superimposed IR spectra that were obtained to monitor each reaction sequence.

FIG. 9 shows the preparation of narrow MWD conjugate 13 at 25% loading of 10. Spectrum (A) is the starting precursor 3, spectrum (B) shows the 25% reduction in the height active ester band after addition of 10, spectrum (C) shows there is no further reduction in the height active ester band at 1735 $cm^{-1}$ when the intermediate reaction mixture of 11 was stirred a further 12 h at 50° C. and spectrum (D) shows the complete disappearance of the active ester band after the addition of ethanolamine to give the narrow MWD copolymeric conjugate 13 with a 25% loading of 10.

FIG. 10. Preparation of narrow MWD conjugate 14 at 25% loading of 10. Spectrum (A) is the starting precursor 3, spectrum (B) shows the 25% reduction in the height active ester band after addition of 10, spectrum (C) shows there is no further reduction in the height active ester band at 1735 $cm^{-1}$ when the intermediate reaction mixture of 11 was stirred a further 12 h at 50° C. and spectrum (D) shows the complete disappearance of the active ester band after the addition of ethanolamine to give the narrow MWD copolymeric conjugate 14 with a 25% loading of 10.

One experiment with one equivalent of amine 10 (100% loading) to produce narrow MWD conjugate 15 was conducted as a further example to demonstrate that since the narrow MWD homopolymeric precursor 3 has a reactive center on each repeat unit, conjugation of bioactive agents using precursor 3 is efficient. This experiment also demonstrates that the reaction of an amine once 95% incorporation has occurred may have a slower rate because there are relatively few reactive sites remaining. This is why it is important for the conjugation reactions to make narrow MWD, water soluble copolymer conjugates (such as for example 12, 14 and 15) that the second amine be added in excess. The superimposed IR spectra obtained to monitor the reaction to prepare the narrow MWD homopolymeric conjugate 15 are shown in FIG. 11.

Figure 11:
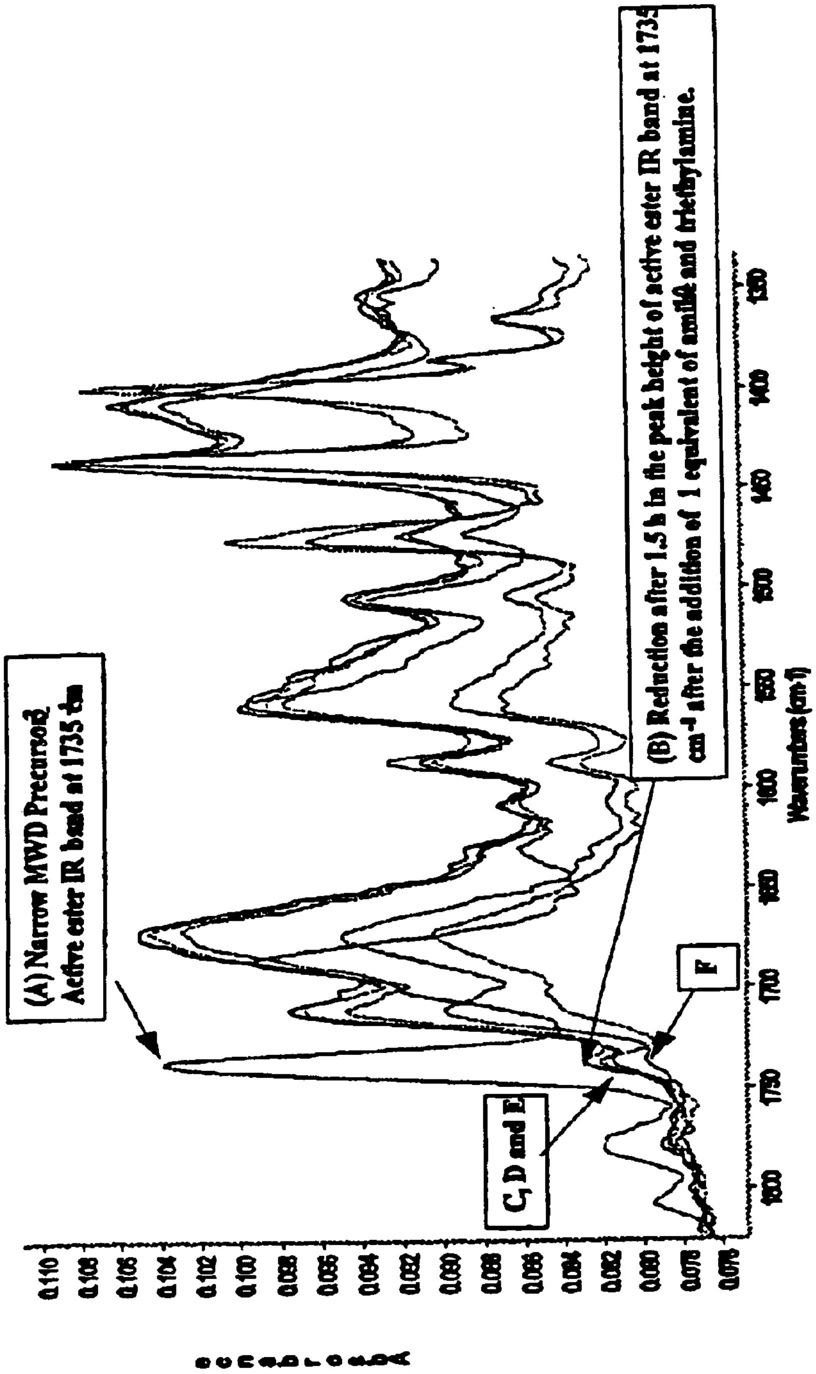
FIG. 11. Preparation of narrow MWD conjugate 15 at 100% loading of 10.

FIG. 11 shows the preparation of narrow MWD conjugate 15 at 100% loading of 10. Spectrum (A) is the starting precursor 3, spectrum (B) shows the approximately 95% reduction in the height active ester band after addition of 10 after 1 h, spectra (C, D and E) shows the continued further reduction in the height active ester band at 1735 $cm^{-1}$ as reaction stirred a total of 2, 3.5 and 4.5 h respectively at 50° C. and spectrum (E) shows the complete disappearance of the active ester band after the reaction mixture stirred a total of 16 h at 50° C. to give the narrow MWD homopolymeric conjugate 15 with a 100% loading of 10.

Example 6

Chain Extension Reaction. Synthesis of Poly(methacryloxy succiminde-co-methacryloxy Succinimide) 16.

A prerequisite for preparing block copolymers by copper mediated polymerisation is to demonstrate that the dormant chain end groups will initiate a further polymerisation reaction that gives a narrow MWD block without addition of initiator (e.g. 2).

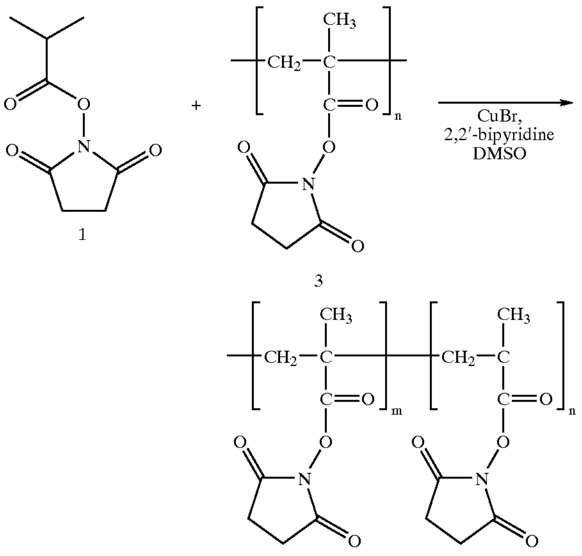

16

Into an argon purged vessel containing copper(I)bromide (4.8 mg, 0.03 mmol), bipyridine (10.4 mg, 0.06 mmol), methacryloxy succinimide 1 (1 g, 5.5 mmol) and poly (methacryloxy succinimide) 3 (0.5 g, number average molecular weight of 33,800 g/mol; polydispersity index 1.15, GPC, DMF eluent, PMMA calibration standards), which had previously been prepared by copper mediated polymerisation, was added DMSO (0.25 g, previously degassed by argon purge). The vessel was stoppered and heated at 130° C. for approximately 10 minutes. After cooling, more DMSO (approx. 7 ml) was added to dissolve the contents which were then slowly added to a solution of acetone to precipitate the block copolymer 16 which was collected and dried in vacuum to give a white solid (1.1 g, 73%). GPC analysis indicated the extension of the starting polymer had occured to give a new second block to produce poly(methacryloxy succiminde-co-methacryloxy succinimide) 16 with a number average molecular weight of 96,500 g/mol with a polydispersity index of 1.1 (DMF eluent, PMMA calibration standards).

In separate experiments to probe for possible competing thermal initiation, monomer 1 was stirred alone in DMF at 80 and 110° C. over 8–24 hours. This resulted in the formation of some polymer with a high polydispersity index (>2.5). Example 2 has already established that the copper mediated polymerisation of monomer 1 quickly comes to completion. The reaction (1+3→16) of this example is also appears to be very fast (10 minutes) and gives a narrow MWD block copolymer confirming the presence of dormant chain end group required for polymer block formation.

Figure 12:
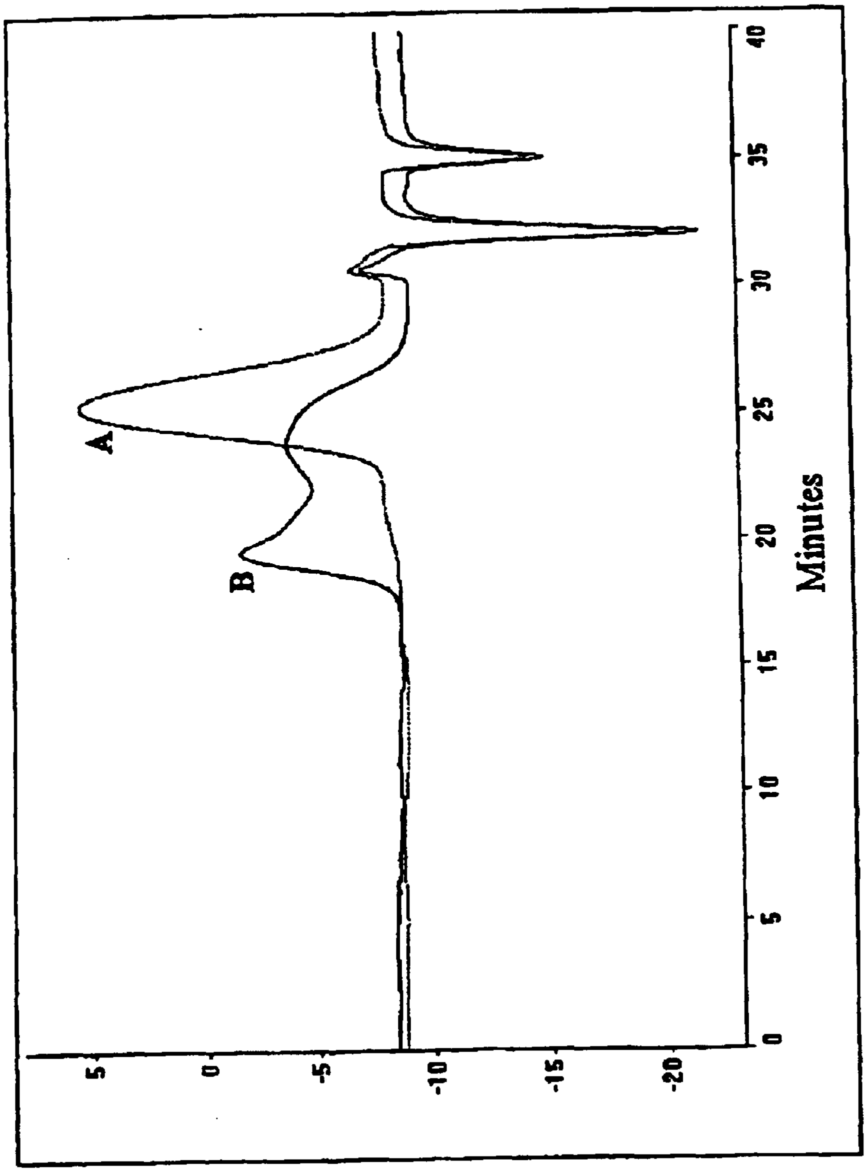
FIG. 12. The GPC for narrow MWD poly(methacryloxy succinimide) 3 (Labelled "A") that was used as the starting polymer in the chain extension reaction described in example 6.

FIG. 12 shows the GPC for narrow MWD poly (methacryloxy succinimide) 3 (Labelled "A") that was used as the starting polymer in the chain extension reaction described in example 6. The GPC labelled "B" displays the chain extension reaction to give poly(methacryloxy succiminde-co-methacryloxy succinimide) 16.

What is claimed is:

1. A polymer comprising the unit (I)

(I)

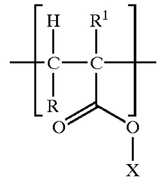

wherein R is selected from the group consisting of hydrogen, $C_1$–$C_{18}$ alkyl, $C_1$–$C_{18}$ alkenyl, $C_1$–$C_{18}$ aralkyl, $C_1$–$C_{18}$ alkaryl, carboxylic acid, carboxy-$C_1$–$C_6$ alkyl, or any one of $C_1$–$C_{18}$ alkyl, $C_1$–$C_{18}$ alkenyl, $C_1$–$C_{18}$, aralkyl, $C_1$–$C_{18}$ alkaryl substituted with a heteroatom within, or attached to, the carbon backbone; $R^1$ is selected from the group consisting of hydrogen and $C_1$–$C_6$ alkyl groups; X is an acylating agent and wherein the polymer has a polydisperity of less than 1.4, and a molecular weight (Mw) of less than 100,000.

2. The polymer according to claim 1, wherein X is a carboxylate activating group.

3. The polymer according to claim 1, wherein R is selected from the group consisting of hydrogen, $C_1$–$C_6$ alkyl, $C_1$–$C_6$ alkenyl, $C_1$–$C_6$ aralkyl and $C_1$–$C_6$ alkaryl, $C_1$–$C_6$ alkylamido and $C_1$–$C_6$ alkylamido.

4. The polymer according to claim 1, wherein $R^1$ is hydrogen, methyl, ethyl, propyl, butyl, pentyl or isomers thereof.

5. The polymer according to claim 1, wherein the molecular weight (Mw) is in the range 50,000–4000.

6. The polymer according to claim 1, wherein R is hydrogen, $R^1$ is methyl.

7. The polymer according to claim 1, wherein the polymer is a homopolymer.

8. A polymer according to claim 1 comprising the unit (II)

(II)

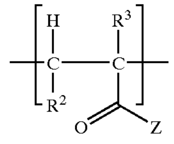

wherein $R^2$ is selected from hydrogen, $C_1$–$C_{18}$ alkyl, $C_1$–$C_{18}$alkenyl, $C_1$–$C_{18}$ aralkyl, $C_1$–$C_{18}$ alkaryl, carboxylic acid and carboxy-$C_1$–$_{16}$alkyl; $R^3$ is selected from the group consisting of hydrogen, methyl, ethyl, propyl, butyl, pentyl and isomers thereof, Z is a pendent group selected from the group consisting of $NR^4R^5$, $SR^6$ and $OR^7$, wherein $R^4$ is an acyl group; $R^5$ is selected from hydrogen, $C_1$–$C_{18}$ alkyl, $C_1$–$C_{18}$ alkenyl, $C_1$–$C_{18}$ aralkyl, $C_1$–$C_{18}$ alkaryl; $R^6$ and $R^7$ are selected from the group consisting of hydrogen, $C_1C_{12}$ alkyl, $C_1$–$C_{12}$ alkenyl, $C_1$–$C_{12}$ aralkyl, $C_1$–$C_{12}$ alkaryl, $C_1$–$C_{12}$ alkoxy and $C_1$–$C_{12}$ hydroxyalkyl, and may contain one or more cleavable bonds and may be covalently linked to a bioactive agent.

9. A polymer according to claim 8, wherein Z comprises one or more hydrolytically labile groups selected from cis-aconityl, and amninoacyl groups.

10. A polymer according to claim 8 comprising the unit (II) wherein $R^2$ is hydrogen, $C_1$–$C_{18}$ alkyl, $C_1$–$C_{18}$ alkenyl, $C_1$–$C_{18}$ aralkyl, $C_1$–$C_{18}$ alkaryl, $R_3$ is selected from the group consisting of hydrogen, methyl, ethyl, propyl, butyl, pentyl and isomers thereof, Z is a pendent group $NR^4R^5$, wherein $R^4$ is an acyl group; $R^5$ is selected from hydrogen, $C_1$–$C_8$ alkyl, $C_1$–$C_{12}$ alkenyl, $C_1$–$C_{12}$ aralkyl, $C_1$–$C_{12}$ alkaryl; and wherein the polymer has a molecular weight (Mw) of less than 50,000.

11. A polymer according to claim 8 wherein (II) is linked to a bioactive agent and the bioactive agent is a drug.

12. A polymer according to claim 11 wherein the group is an anti-cancer agent.

13. A polymer according to claim 8, wherein the polymer has the structure (III)

(III)

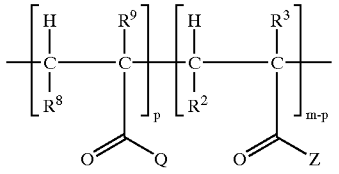

wherein $R^8$ and $R^9$ are selected from the same groups as $R^2$ and $R^3$ respectively, Q is a solubilising group selected from the group consisting of $C_1C_{12}$ alkyl, $C_1$–$C_{12}$ alkenyl, $C_1$–$C_{12}$ aralkyl, $C_1$–$C_{12}$ alkaryl, $C_1$–$C_{12}$ alkoxy, $C_1$–$C_{12}$ hydroxyalkyl, $C_1C_{12}$ allylamido, $C_1$–$C_{12}$ alkylamido, $C_1$–$C_{12}$ alkanoyl, and wherein m and p are integers of less than 500.

14. A polymer according to claim 13 wherein Q is a $C_1$–$C_{12}$ hydroxyalkylamino group.

15. A process for the production of a polymer, comprising the radical polymerization of ethylenically unsaturated compounds comprising a compound (IV)

(IV)

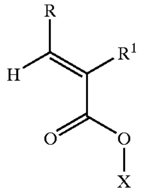

wherein R is selected from the group consisting of hydrogen, $C_1$–$C_{18}$ alkyl, $C_1$–$C_{18}$ alkenyl, $C_1$–$C_{18}$ aralkyl, $C_1$–$C_{18}$ alkaryl, carboxyl, carboxyalkyl, or any one of $C_1$–$C_{18}$ alkyl, $C_1$–$C_{18}$ alkenyl, $C_1$–$C_{18}$ alkaryl, $C_1$–$C_{18}$ alkaryl substituted with a heteroatom within, or attached to, the carbon backbone; $R^1$ is selected from the group consisting of hydrogen and $C_1$–$C_6$ alkyl groups; X is a carboxylate activating group; wherein the process is a controlled radical polymerization, to produce a polymer comprising the unit (I)

(I)

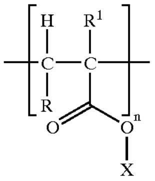

wherein n is an integer of 1 to 500 and wherein the polymer has a polydisperity of less than 1.4 and a molecular weight (Mw) of less than 100,000.

16. A process according to claim 15, wherein the process is selected from the group consisting of Reversible Addition Chain Transfer Polymerization, Atom Transfer Polymerization and Nitroxide Mediated Polymerization.

17. The process according to claim 15, wherein the process additionally comprises a solvent, an alkylhalide Atom Transfer Radical Polymerization initiator, and a mediator which comprises a Cu(I)Br moiety complexed by a chelating ligand.

18. The process according to claim 17, wherein the solvent is water or an aprotic solvent selected from the group consisting of tetrahydrofuran, acetonitrile, dimethylformamide, ethyl acetate, acetone, dimethylsulphoxide, methylformamide, sulfolane and mixtures thereof.

19. The process according to claim 16, wherein the polymerization is Nitroxide Mediate Polymerization that takes place in the presence of an initiator having the structure

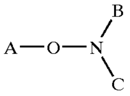

wherein A is selected from the group consisting of $C_1$–$C_{12}$ alkyl, $C_1$–$C_{12}$ alkenyl, $C_1$–$C_{12}$ aralkyl, $C_1$–$C_{12}$ alkaryl, and $C_1C_{12}$ hydroxyalky, B and C are individually selected from the group consisting of $C_1$–$C_{12}$ alkyl, $C_1$–$C_{12}$ alkenyl, $C_1$–$C_{12}$ aralkyl, $C_1$–$C_{12}$ alkaryl and $C_1$–$C_{12}$ hydroxyalkyl, may be joined so that together with N form a $C_5$–$C_{12}$ heterocyclic group, and which may contain one or more additional heteroatoms selected from nitrogen, sulfur, oxygen and phosphorus.

20. The process according to claim 19, wherein A is selected from the group consisting of methyl ethyl, propyl, butyl, pentyl, hexyl, benzyl, methylbenzene, ethyl benzene, propylbenzene or isomers thereof, and B and C are selected from the group consisting of isopropyl, isobutyl, secbutyl, tertbutyl, isopentyl, sec-pentyl, tert-pentyl, adamantyl, methylbenzene, ethyl benzene, propylbenzene or isomers thereof.

21. The process according to claim 19 wherein the initiator has a structure selected from the group consisting of

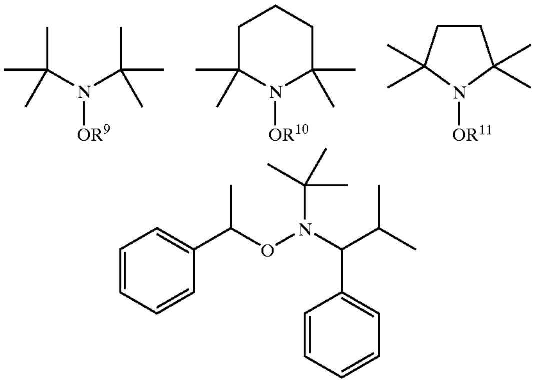

wherein $R^9$ to $R^{11}$ are selected from the group consisting of $C_1$–$C_{12}$ alkyl, $C_1$–$C_{12}$, alkenyl, $C_1$–$C_{12}$ aralkyl and $C_1$–$C_{12}$ alkaryl.

22. A process for the production of a derivitised polymer, comprising the reaction of a polymer having the formula (VI)

(VI)

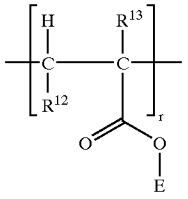

wherein $R^{12}$ is a group selected from the group consisting of hydrogen, $C_1$–$C_{18}$ alkyl, $C_1$–$C_{18}$ alkenyl, $C_1$–$C_{18}$ aralkyl and $C_1$–$C_{18}$ alkaryl groups; $R^{13}$ is selected from the group consisting of $C_1$–$C_6$ alkyl groups; E is a carboxylate activating group and r is an integer of 5 to 500; with a reagent $HR^x$, wherein $R^x$ is selected from the group consisting of $NR^{14}R^{15}$, $SR^{16}$ and $OR^{17}$, wherein $R^{14}$ is an acyl group; $R^{15}$ is selected from hydrogen, $C_1$–$C_{18}$ alkyl, $C_1$–$C_{18}$ alkenyl, $C_1$–$C_{18}$ aralkyl, and $C_1$–$C_{18}$ alkaryl; $R^{16}$ and $R^{17}$ are selected from the group consisting of hydrogen, $C_1$–$C_{12}$ alkyl, $C_1$–$C_{12}$ alkenyl, $C_1$–$C_{12}$ aralkyl, $C_1$–$C_{12}$ alkaryl, $C_1$–$C_{12}$ alkoxy and $C_1$–$C_{12}$ hydroxyalkyl, and may contain one or more cleavable bonds, to form a derivatised polymer having the structure (VII)

(VII)

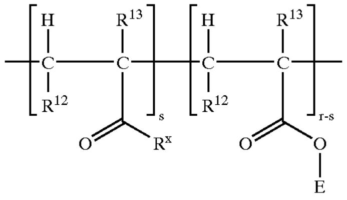

wherein $1 \leqq s \leqq r$.

23. A process according to claim 22 wherein $R^{12}$ selected from the group consisting of hydrogen, methyl, ethyl and propyl, and $R^{13}$ is selected from the group consisting of hydrogen, methyl, ethyl and propyl.

24. A process according to claim 22, wherein E is selected from the group consisting of N-succinimidyl, pentachlorophenyl, pentafluorophenyl, para-nitrophenyl, dinitrophenyl, N-phthalimido, N-norbornyl, cyanomethyl, pyridyl, trichlorotriazine, 5-chloroquinilino, and imidazole.

25. A process according to claim 23, wherein the polymer of formula (VI) is a polymer of formula (I)

(I)

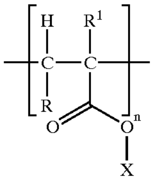

26. A process according to claim 22, wherein the polymer of the formula (I)

(I)

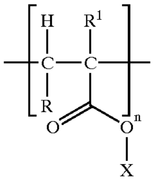

is reacted in a second step with a reagent $HR^x$ as defined in claim 22, whereby at least some of the groups —OX are replaced by —$R^x$ in the product derivatised polymer.

27. A process according to claim 26, wherein $HR^x$ is $H_2NR^{14}$.

28. A process according to claim 27, wherein $R^x$ comprises one or more aminoacyl groups.

29. A process according to claim 28 wherein $R^x$ comprises a bioactive agent.

30. A process according to claim 29, comprising the additional step of reacting the unreacted groups, OE or OX groups, with a solubilising group selected from the group consisting of $C_1$–$C_{12}$ alkyl, $C_1$–$C_{12}$ alkenyl, $C_1$–$C_{12}$ aralkyl, $C_1$–$C_{12}$ alkaryl, $C_1$–$C_{12}$ alkoxy, $C_1$–$C_{12}$ hydroxyalkyl, $C_1$–$C_{12}$ alkylamido, $C_1$–$C_{12}$ alkylamido, $C_1$–$C_{12}$ alkanoyl.

31. A process for the production of block copolymers comprising the steps of:

a. reacting a polymer having the formula (VI)

(VI)

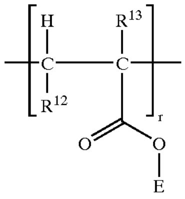

wherein $R^{12}$ is a group selected from the group consisting of hydrogen, $C_1$–$C_{18}$ alkyl, $C_1$–$C_{18}$ alkenyl, $C_1$–$C_{18}$ aralkyl, and $C_1$–$C_{18}$ alkaryl groups; $R^{13}$ is selected from the group consisting of $C_1$–$C_6$ alkyl groups; E is a carboxylate activating group and r is an integer of 5 to 500; with a reagent $HR^x$, wherein $R^x$ is selected from the group consisting of $NR^{14}R^{15}$, $SR^{16}$, and $OR^{17}$, wherein $R^{14}$ is an acyl group; $R^{15}$ is selected from hydrogen, $C_1$–$C_{18}$ alkyl, $C_1$–$C_{18}$ alkenyl, $C_1$–$C_{18}$ aralkyl, and $C_1$–$C_{18}$ alkaryl; $R^{16}$ and $R^{17}$ are selected from the group consisting of hydrogen, alkyl, $C_1$–$C_{12}$ alkenyl, $C_1$–$C_{12}$ aralkyl, $C_1$–$C_{12}$ alkaryl, $C_1$–$C_{12}$ alkoxy and $C_1$–$C_{12}$ hydroxyalkyl, and may contain one or more cleavable bonds, to form a derivatised polymer having the structure (XV)

(XV)

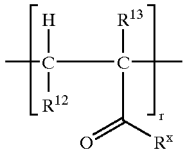

b. reacting (XV) in a polymerisation reaction with between 0.01 and 100 unit equivalents of (VI) to form a polymer (XVI)

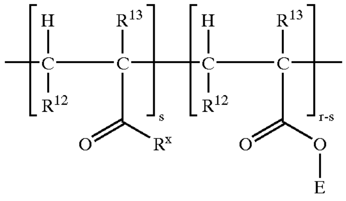

(VII)

wherein $1 \leqq s \leqq r$.

32. A process according to claim 31 wherein (VII) is subsequently reacted between 0.01 and 100 unit equivalents of reagent $HR^x$, wherein $R^x$ is a solubility modifying group.

33. A process according to claim 32, wherein $R^x$ is a hydrophilic group selected from amino-$C_{1-12}$ alkyl, amino-$C_{1-12}$ dialkyl, and amino-$C_{1-12}$ alkanol.

34. A process according to claim 31, wherein step B is a Controlled Radical Polymerisation process.

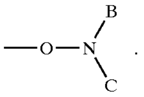

35. A composition comprising a polymer as defined in claim 1 and a pharmaceutically acceptable excipient.

36. A process according to claim 34, wherein step B is a Controlled Radical Polymerisation process and in which polymer of the structure (XV) has a terminal group.

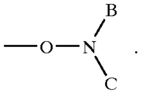

37. A process according to claim 31, wherein $R^{14}$ is an aminoacyl group or an oligopeptidyl group.

38. A process according to claim 29, wherein $R^x$ is an anti-cancer drug.

39. A process according to claim 22, wherein $R^{14}$ is an aminoacyl group or an oligopeptidyl group, $R^{12}$ is hydrogen, $R^{13}$ is methyl, E is N-succinimidyl or imidazole, and $R^x$ is 2 to 6 aminoacyl groups.

40. A process according to claim 39, wherein E is N-succinimidyl and $R^x$ is 4 aminoacyl groups.

41. A process according to claim 17, wherein the Atom Transfer Radical Polymerization initiator is an alkylbromide, and the mediator is selected from the group consisting of $Cu(I)Br(Bipy)_2$, Cu(I)Br(Bipy)N, Cu(I)Br(N,N',N",N"-pentamethyldiethylenetriamine), Cu(I)Br[methyl$_6$ tris(2-aminoethyl)amine] and Cu(I)Br (pentamethyldiethylene).

42. A process according to claim 15, wherein the $R^1$ $C_1$–$C_6$ alkyl group is selected from the group consisting of methyl, ethyl, propyl, butyl, pentyl and isomers thereof.

43. A polymer according to claim 12 wherein the anti-cancer agent is doxorubicin, daunomycin, or paclaxitel.

44. A polymer according to claim 13 wherein Q is 2-hydroxypropylamino.

45. A process according to claim 8, wherein $R^4$ is an aminoacyl group or an oligopeptidyl group and Z is 2 to 6 aminoacyl groups.

46. The polymer according to claim 1, wherein X is selected from the group consisting of N-succinimidyl, pentachlorophenyl, pentafluorophenyl, para-nitrophenyl, dinitrophenyl, N-phthalimido, N-norbornyl, cyanomethyl, pyridl, trichlorotriazine, 5-chloroquinilino, and imidazole, and R is hydrogen or methyl.

47. The polymer according to claim 1, wherein the molecular weight (Mw) is in the range 25,000–40,000.

48. The polymer according to claim 1, wherein the polydispersity is less than 1.2.

49. A composition comprising a polymer as defined in claim 48 having a molecular weight (Mw) in the range 25,000–40,000 and a pharmaceutically acceptable excipient.

* * * * *